(12) United States Patent
Presby

(10) Patent No.: US 8,342,212 B2
(45) Date of Patent: Jan. 1, 2013

(54) FLUID CONDUIT WITH LAYERED AND PARTIAL COVERING MATERIAL THEREON

(75) Inventor: David W. Presby, Sugar Hill, NH (US)

(73) Assignee: Presby Patent Trust, Whitefield, NH (US)

( * ) Notice: Subject to any disclaimer, the term of this patent is extended or adjusted under 35 U.S.C. 154(b) by 1127 days.

(21) Appl. No.: 11/915,150

(22) PCT Filed: May 23, 2006

(86) PCT No.: PCT/US2006/019718
§ 371 (c)(1),
(2), (4) Date: Nov. 20, 2007

(87) PCT Pub. No.: WO2006/132790
PCT Pub. Date: Dec. 14, 2006

(65) Prior Publication Data
US 2008/0271805 A1     Nov. 6, 2008

Related U.S. Application Data

(60) Provisional application No. 60/683,994, filed on May 24, 2005.

(51) Int. Cl.
*F16L 9/18* (2006.01)
(52) U.S. Cl. .......... 138/112; 138/121; 138/125; 405/43; 405/45; 405/49; 210/170.08
(58) Field of Classification Search ................ 138/112, 138/121, 125; 405/43, 45, 49; 210/170.08
See application file for complete search history.

(56) References Cited

U.S. PATENT DOCUMENTS

| | | | | |
|---|---|---|---|---|
| 3,485,706 A * | 12/1969 | Evans | | 428/134 |
| 3,830,373 A * | 8/1974 | Sixt | | 210/489 |
| 3,976,578 A | 8/1976 | Beane | | |
| 4,019,326 A * | 4/1977 | Herveling et al. | | 405/45 |
| 4,204,967 A * | 5/1980 | Bannister | | 210/459 |
| 4,288,321 A | 9/1981 | Beane | | |
| 4,529,414 A * | 7/1985 | Naess | | 95/46 |
| 4,662,778 A | 5/1987 | Dempsey | | |
| 4,904,113 A | 2/1990 | Goddard et al. | | |
| 4,909,665 A | 3/1990 | Caouette | | |
| 5,002,427 A | 3/1991 | Kambe et al. | | |
| 5,224,832 A | 7/1993 | Gonczy et al. | | |
| 5,429,752 A | 7/1995 | Presby | | |
| 5,480,260 A * | 1/1996 | Shattuck et al. | | 405/36 |
| 5,954,451 A | 9/1999 | Presby | | |
| 6,293,998 B1 * | 9/2001 | Dolan et al. | | 95/96 |
| 6,315,493 B2 * | 11/2001 | Malone et al. | | 405/45 |

(Continued)

Primary Examiner — James Hook
(74) Attorney, Agent, or Firm — Finch & Maloney PLLC

(57) ABSTRACT

A fluid conduit with layered and partial covering material thereon is disclosed. The fluid conduit may be used for processing and treatment of fluids which must be treated to remove materials so that the resultant treated fluid may be reused and/or returned to the earth and particularly to the water table. The fluid conduit may be of many forms and types and may have attached thereto and configured thereon covering material in partial form and a selected number of layers. The fluid conduit may be a septic pipe of smooth wall, of corrugated form, and/or of any form of cross-sectional configuration including circular, elliptical, rectangular, triangular, or any other geometric shape. The fluid conduit may be used in combination with conduit in a drainage field or leaching system usually associated with a septic tank or septic system.

6 Claims, 20 Drawing Sheets

U.S. PATENT DOCUMENTS

| | | |
|---|---|---|
| 6,461,078 B1 | 10/2002 | Presby |
| 6,613,954 B1 * | 9/2003 | Horney et al. ............... 604/364 |
| 7,618,213 B2 * | 11/2009 | Durkheim .................. 405/49 |
| 2003/0113489 A1 * | 6/2003 | Smith ...................... 428/34.5 |
| 2005/0269253 A1 * | 12/2005 | Potts ......................... 210/150 |
| 2008/0202999 A1 * | 8/2008 | Potts ....................... 210/170.01 |

\* cited by examiner

FLUID CONDUIT WITH LAYERED AND PARTIAL COVERING MATERIAL THEREON

CROSS-REFERENCE TO RELATED APPLICATIONS

This Patent Application claims the benefit of U.S. Provisional Application No. 60/683,994 filed May 24, 2005; U.S. Pat. No. 6,461,078; Issued Oct. 8, 2002 for U.S. patent application Ser. No. 09/524,238; Filed Mar. 13, 2000 entitled as "PLASTIC SEWAGE PIPE" and also the benefit of U.S. Pat. No. 5,954,451; Issued Sep. 21, 1999 for U.S. patent application Ser. No. 08/998,351; Filed Dec. 18, 1997 entitled as "A METHOD AND APPARATUS FOR USING MULTI-LAYER MATERIAL IN PROCESSING OF SEPTIC EFFLUENT AND WASTE WATER". The drawing figures, the method of use, the advantages and additional characteristics and the functionality of U.S. Pat. Nos. 6,461,078 and 5,954,451 are included herein as referenced thereto.

BACKGROUND OF THE INVENTION

1. Field of the Invention

This invention most generally relates to fluid conduits, and more particularly to fabric-covered fluid conduits.

2. Description of the Prior Art

Suspended solids have plagued the septic system and wastewater treatment industry more in the last ten or more years than in previous years. The increase in the problem is due in part to the evolution and development of some of the modern day cleaners which now make cleaning easier, in that they cause grease and oil to dissolve into the water. The major problem with the septic tank is that the suspended solids passing through the tank neither cool nor make contact at a slow enough pace to separate from the water.

Lint and fuzz also have been an ongoing problem for the septic tank to control. This material stays suspended in the septic tank liquid and normally passes through, remaining suspended in the effluent, which subsequently also causes problems in the leach system connected with the septic tank.

Septic tanks generally available do not effectively provide for the removal, in a manner which does not affect the cost and the performance characteristics of the septic treatment system, of suspended solids that are typically found in septic tank liquid. It is important that the amount of suspended solids that leave the treatment tank be minimal so as not to adversely affect the subsequent treatment of the wastewater/effluent. A leach field, for example, is adversely affected because the suspended solids will clog the layer that receives them and also adversely affect the absorption characteristics of the leach bed.

Currently there are designs and equipment that attempt the removal of the suspended solids. All of those known to the inventor of the now-patented precipitation apparatus defined in U.S. Pat. No. 5,429,752 have failed to address the problem in an efficient manner, because all the efforts attempt to "filter" the liquid. Filtration creates an additional set of problems. The filters can quickly become plugged, slowing down or completely blocking the flow-through of the liquid through the treatment tank. The filters are expensive and are costly to maintain. Applicant's patented precipitation apparatus greatly reduces the level of suspended solids exiting the treatment tank and entering the leach system.

The following patents relate to the technology of the present invention, but none of them meets the objects of the disclosed and claimed improved system in a manner like that of the instant invention. Additionally, none are as effective and as efficient as the instant improved conduit system.

U.S. Pat. No. 3,976,578 to Beane discloses a protective sleeve for corrugated drainage tubes. The protective sleeve is a continuous tubular sleeve of knit fabric material which is slipped over one or more sections of corrugated flexible drainage pipe and acts as a filter to keep rocks, dirt, mud, pieces of clay, and the like from clogging the openings in the corrugated drainage pipe while allowing the water to pass through. Disclosed is a knit fabric preferably formed by lock stitches and is inherently elastic.

U.S. Pat. No. 4,909,665 to Caouette discloses a fabric-wrapped corrugated structure. The fabric wrapping comprises an outer fabric combined with a grid mesh separation element. It is disclosed that the fabric may be of the woven or non-woven type and that the fabric may be bonded to the grid mesh. Further, Caouette discloses that the grid mesh may take many different forms as long as one set of cross members or other members such as dimples on a planar structure or fibrous material provides some separation of the fabric above the peaks of the corrugated pipe.

U.S. Pat. No. 5,224,832 to Gonczy et al. discloses a multilayer insulation blanket used in heat transfer technology which can be wrapped around a structure. The Gonczy patent does not disclose the use of multilayer fabrics of varying deniers and does not disclose the liquid permeability of the multilayer blanket.

U.S. Pat. No. 4,288,321 to Beane discloses a drain tile and a pile fabric filter sleeve. The knit fabric of the '321 patent to Beane is provided over the drainage conduit to facilitate efficient liquid flow. The knit fabric is also impregnated with suitable chemical agents for counteracting anticipated chemical reaction particle intrusions. The knit fabric is further disclosed to be formed of stitches defining a ground and defining terry loops extending from the ground and being directed in a predetermined generally radial direction relative to the longitudinal axis of the drainage conduit.

U.S. Pat. No. 4,904,113 to Goddard et al. discloses a highway edgedrain. The edgedrain comprises a tube inserted into a fabric sheath. The fabric sheath of the '113 patent is preferably of a nonwoven fabric and of a geotextile composition. The sheath acts as a filter to prevent the passage of large particles or rocks into the tube. Further, the sheath is disclosed as being made from a material of a single density.

U.S. Pat. No. 4,662,778 to Dempsey discloses a drainage mat. Most significantly, the '778 patent discloses a drainage material with extended surface which is a two-layer composite of polyester non-woven filter fabric heat bonded to an expanded nylon non-woven matting such as ENKADRAIN™ brand of three-dimensional composite.

U.S. Pat. No. 5,002,427 to Kambe et al. discloses a hydrophobic material used for drainage of a culvert. The '427 patent discloses a textile or knit fabric having large and small mesh portions.

The patents noted herein provide considerable information regarding the developments that have taken place in this field of technology. Clearly, the instant invention provides many advantages over the prior art inventions noted above. Again, it is noted that none of the prior art meets the objects of the multilayered fabric as used in septic and wastewater treatment in a manner like that of the instant invention. None of them is as effective and as efficient as the instant combination of multilayered fabric and corrugated pipe combination for use in the management of effluent drainage systems.

SUMMARY OF THE INVENTION

In one aspect, the present invention may be a device including: a conduit including apertures therethrough; a first fabric layer covering a lower section of the circumference of the conduit; a first coarse layer surrounding the first fabric layer; and a second fabric layer over the coarse layer and covering completely the circumference of the conduit. The device may be constructed and arranged such that the first fabric layer covers less than one half the circumference of the conduit. The device may include a third fabric layer and a second coarse layer, the third fabric layer positioned between the first coarse layer and the second coarse layer wherein the third fabric layer covers a greater portion of the conduit than does the first fabric layer and does not cover the entire circumference of the conduit. The device may include a plurality of additional fabric layers and coarse layers, each fabric layer positioned between two coarse layers and wherein each successive fabric layer from interior to exterior covers a greater portion of the circumference of the conduit. The device may be constructed and arranged such that the coarse layer comprises a coarse, random fiber layer. The device may be constructed and arranged such that the coarse layer comprises a plastic grid mesh. The device may be constructed and arranged such that the first fabric layer is a geo-textile fabric. The device may include a biomat on the second fabric layer.

In another aspect, the present invention may include a method of treating an effluent including: passing the effluent along the interior of a conduit including apertures therethrough; restricting the flow of the fluid out of the apertures with a dense fabric layer; causing at least a portion of the effluent to overflow the upper edges of the dense fabric layer; and flowing the fluid through an outer layer of fabric. The method may utilize a conduit that is substantially horizontal. The method may include passing the fluid through coarse fibers prior to flowing the fluid through the outer layer of fabric. The method may include pretreating the fabric layers with chemicals, bacteria and/or microbes. The method may include forming a biomat on the outer layer of fabric.

In yet another aspect, the present invention may be an apparatus including: a first fabric layer constructed and arranged to form a series of alternating U-shaped peaks and troughs; spacers within each of the peaks and troughs to retain the shape of the peaks and troughs; a second fabric layer within at least one of the troughs, the second fabric layer extending from the bottom of the trough upwardly along both walls of the trough; and a mesh layer separating the first fabric layer and the second fabric layer. The apparatus may include a biomat layer on the second fabric layer. The apparatus may be constructed and arranged such that the second fabric layer is positioned between a spacer and the first fabric layer.

This invention most generally relates to a fluid conduit with layered and partial covering material thereon and means and method for configuring with covering material, in partial form and layers, a covering of fluid conduit/conductors resulting in the creation of a novel and very effective, in functionality, component of a fluid conduit/conductive system such as a septic pipe of smooth wall, of corrugated form, of any form of cross sectional configuration including circular, elliptical, rectangular, triangular or any other geometric shape any of which will and can provide for the flow of a fluid of forms such as septic flow fluid and the like. Included herein as a part of the invention are fluid conduits produced by the means and methods of this invention. Substantially, the fluid conduit system having incorporated therein and thereon the form and layers of covering created as a consequence of the means and method of configuring such conduit included as a feature of the invention. Such covering material most generally used, but not totally limited to, is a multilayer fabric of varying deniers for the processing and treatment of fluids which must be treated to remove materials so that the resultant treated fluid may be reused and/or returned to the earth and particularly to the water table. More particularly, the invention of the partial and variable form of fluid conduit coating relates to the use of multilayer fabric, each layer being of selected denier, in combination with conduit/conductor, either smooth-walled or corrugated, used most likely in a drainage field or leaching system usually associated with a septic tank or system. At least one of the layers of the multilayer fabric is formed from an unstructured assemblage of fibers. The unstructured assemblage of fibers provides a large surface area whereon consequent biodegradation of the oils, greases, and chemicals takes place permitting treated fluid to pass omnidirectionally through the unstructured assemblage of fibers and subsequently leach into the ground. Most particularly, the multilayer fabric of varying deniers may be wrapped around a corrugated plastic pipe of the type well known in the field of drainage or leaching fields. Additionally, the fabric layers may be pretreated with chemicals, bacteria, and/or microbes, such as known oil-digesting microbes, in order to particularize the use of the drainage and waste treatment created as a consequence of the invention in forming the consequential resulting fluid processing and treatment apparatus in the processing or treating of fluids.

The invention has the particular objectives, features, and advantages of:
1. Multiple layers of fabric;
2. Fabric layers of varying deniers;
3. Usefulness in wrapping corrugated plastic pipe;
4. With the selection of fabric, various fabric properties such as denier, thickness, and retention quality, such as hydrophobic or hydrophilic characteristics, can be altered so that specific fluid treatment objectives can be met;
5. The multilayer fabric provides boundaries/interfaces and regions within which specifically chosen bacteria, chemicals, microbes and the like may be introduced to facilitate the biodegradation of specifically chosen undesirable materials; and
6. Improved performance over the currently known leach fields and currently known fluid conduits used for various forms of treatment of conducted fluid with the conduit.

Even more particularly, the invention is particularly useful in combination with the septic tank maze apparatus defined and described in Applicant's U.S. Pat. No. 5,429,752, titled MEANS FOR PRECIPITATING OUT SUSPENDED SOLIDS IN SEPTIC TANK LIQUIDS and issued on Jul. 4, 1995. The septic tank having such a maze incorporated therein has an outflow into a leach system of effluent or leachate which is substantially devoid of solids.

Some particular aspects of interest for the multilayer fabric wrapped corrugated pipe invention are:
1. Longer life and no shadow effects;
2. Less masking;
3. More storage and breakdown area within the fabric layers;
4. Different grades of bacterial area;
5. Different interfaces for bacteria;
6. The division of different types of material;
7. Less clogging;
8. Septic use and floor drain use;
9. May be used over valley with any material that gives spacing and may also be used over smooth wall pipe;
10. May be used on incoming/outgoing liquids; that is, the process would work for liquid moving from within to without the pipe or moving from without to within;

11. Any pretreatment of surface or subsurface fluids to include trapping collecting or dispersing fluids into and out of the ground;
12. Fabric may be pretreated with chemical, bacteria and/or combinations and such pretreatment may be specific for applications such as oil-spill or the like;
13. Multi-layered fabrics and different deniers and different thicknesses may be combined again to achieve specific functions;
14. Treating liquids on the inside, trapping things inside—different fabrics exhibit retaining properties relative to specific materials, and likewise different materials have varying treatment properties for different substances such as oil and effluent;
15. At all of the interfaces of the multilayered fabric and at the interface of the fabric with the conduit surface and the soil, fluids are being treated in a progressive manner resulting in a treated fluid having an acceptable standard of quality; and
16. May be used on corrugated or smooth-walled structures or any fluid-carrying structure that passes fluids through itself or through holes/slots/cuts over/under/through/around.

BRIEF DESCRIPTION OF THE DRAWINGS

Included herewith in this Application is a series of drawing figures. Included are two drawings identified as ENVIRO-SEPTIC® ORIGINAL A and ENVIRO-SEPTIC® NEW A, and in association with the character of the operation of the invention there are figures identified as STAGE 1A through STAGE 4A. Further included is a drawing identified as ENVIRO-SEPTIC® NEW B, and in association with the character of the operation of the invention, when there is a plurality of thick and/or dense fiber layers and a plurality of course fiber layers, there are figures identified as STAGE 1B through STAGE 4B.

Included herewith as a further identification of this invention, Applicant has provided forms of drawing figures identified as drawing FIGS. 1-12 and having numerical identification of elements included thereon. Further, at least FIGS. 1-7 of Applicant's U.S. Pat. No. 5,954,451 may be included, but are included herewith only by reference thereto.

DESCRIPTION OF THE PREFERRED EMBODIMENTS

Figure 1:
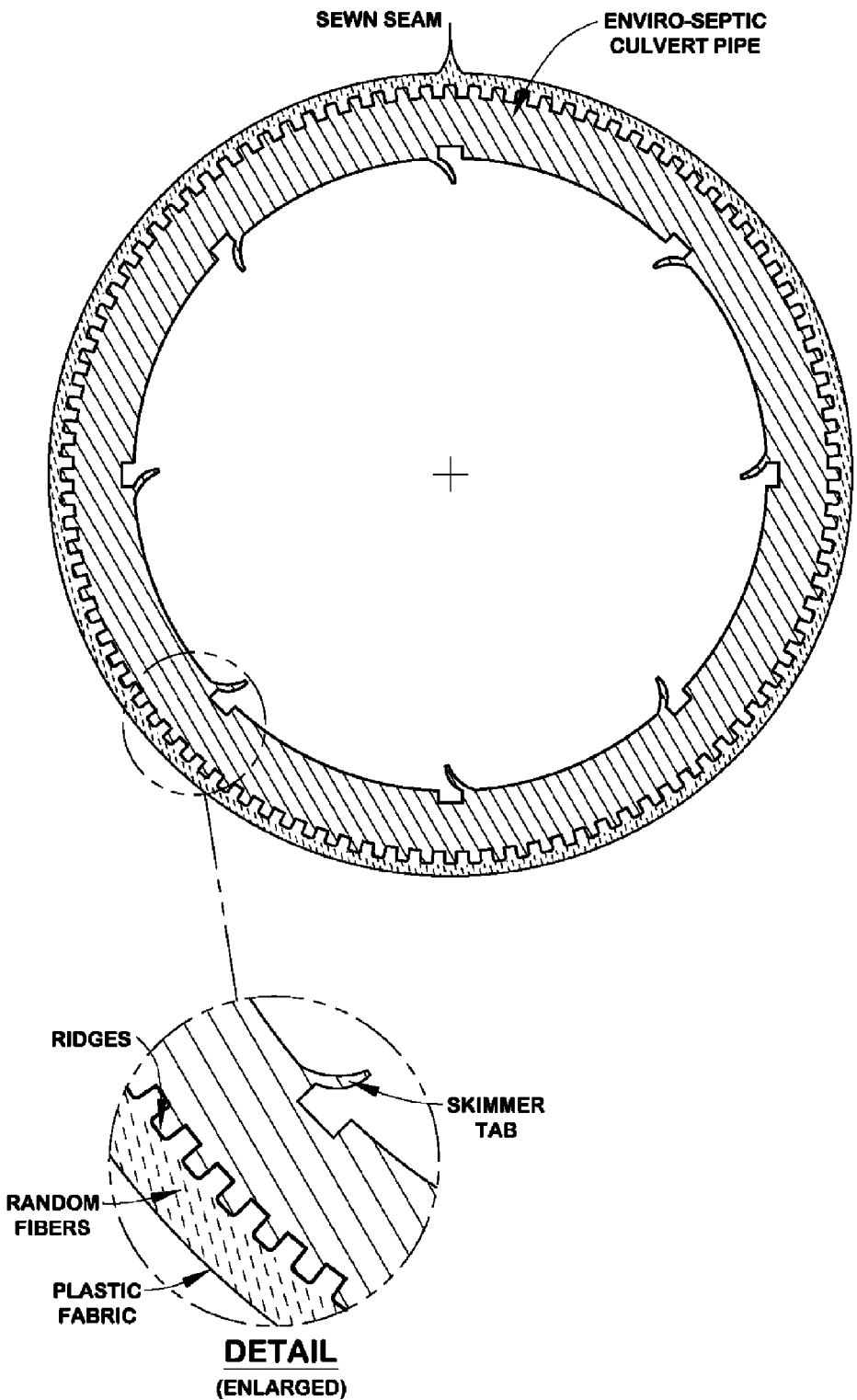
FIG. 1. represents an ENVIRO-SEPTIC® ORIGINAL A and is an illustration of the pipe having a random fiber and a plastic fiber wrapping of the pipe.
Figure 2:
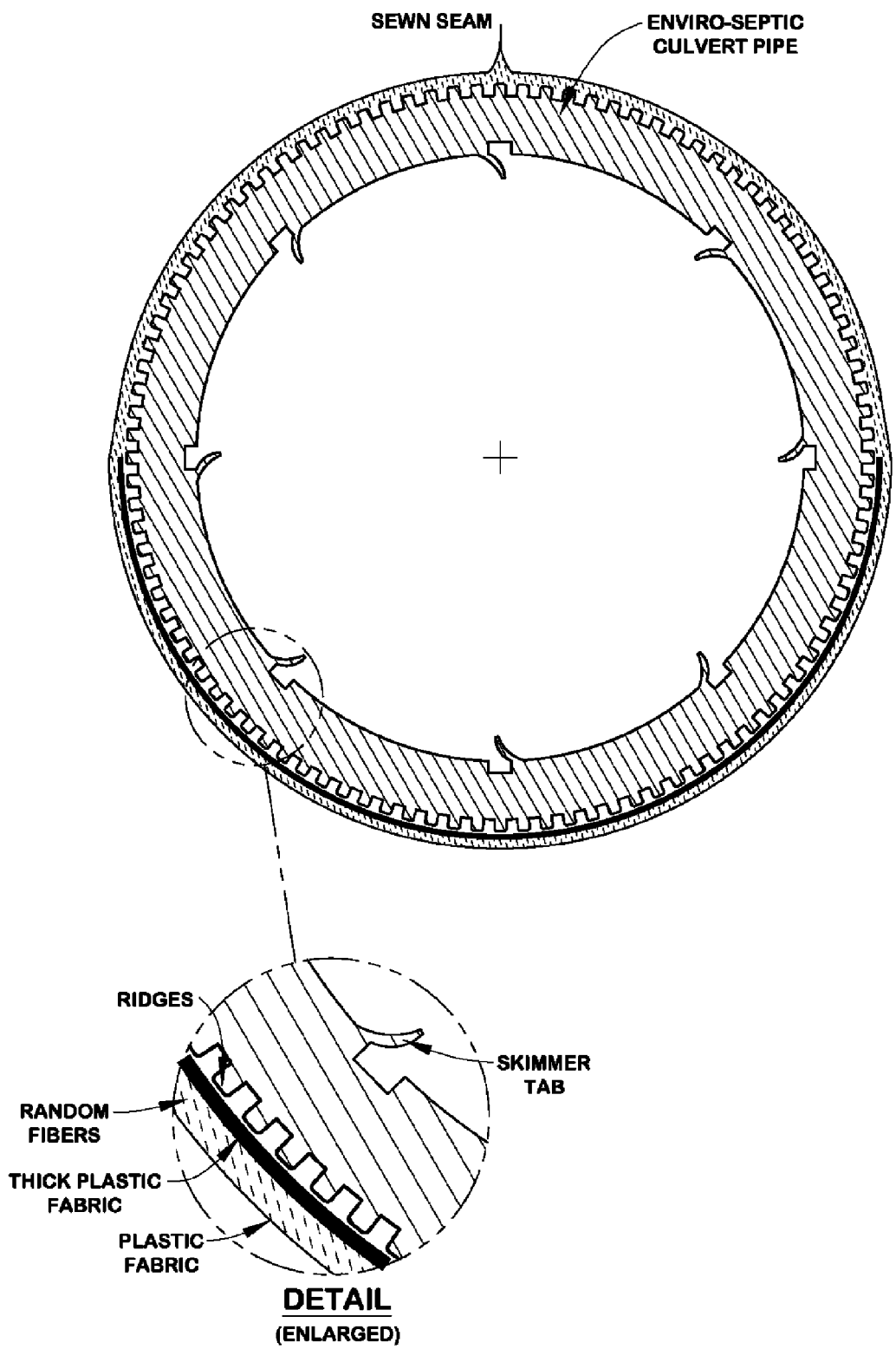
FIG. 2. represents a new form of ENVIRO-SEPTIC® (NEW A) and is an illustration of the pipe having a random fiber and a plastic fiber wrapping of the pipe and one dense fiber on a portion of the pipe outer surface circumference.
Figure 3:
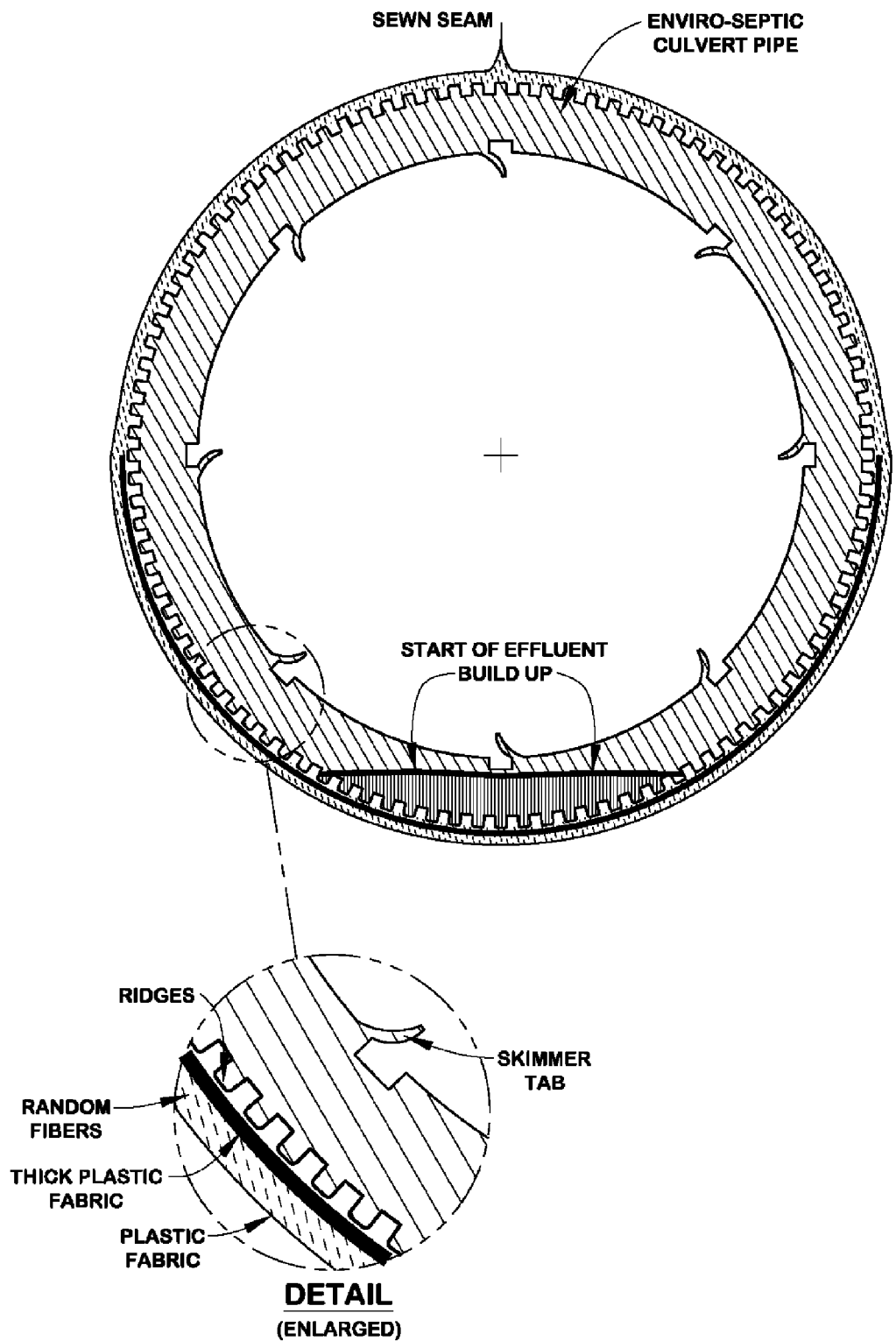
FIG. 3. identified as "STAGE 1A" is an illustration of the early stages of function of the pipe as illustrated in FIG. 2. ENVIRO-SEPTIC® (NEW A) and shows effluent starting to build up on the new fabric layer reaching toward its maximum long-term acceptance rate.
Figure 4:
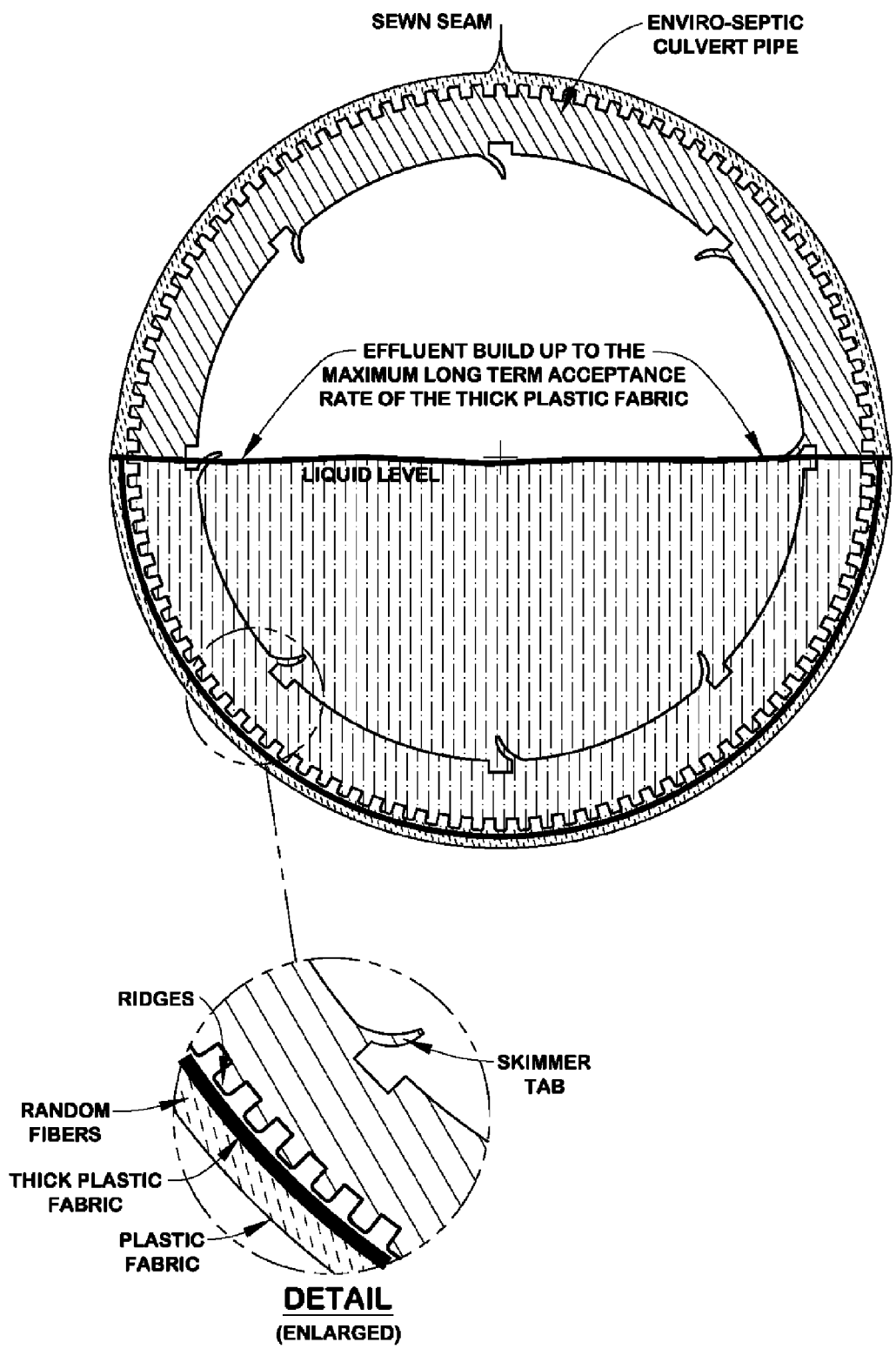
FIG. 4. identified as "STAGE 2A" is an illustration of stages of function of the pipe as illustrated in FIG. 2. ENVIRO-SEPTIC® (NEW A) and shows effluent has built up on the new fabric layer reaching its maximum long-term acceptance rate.
Figure 5:
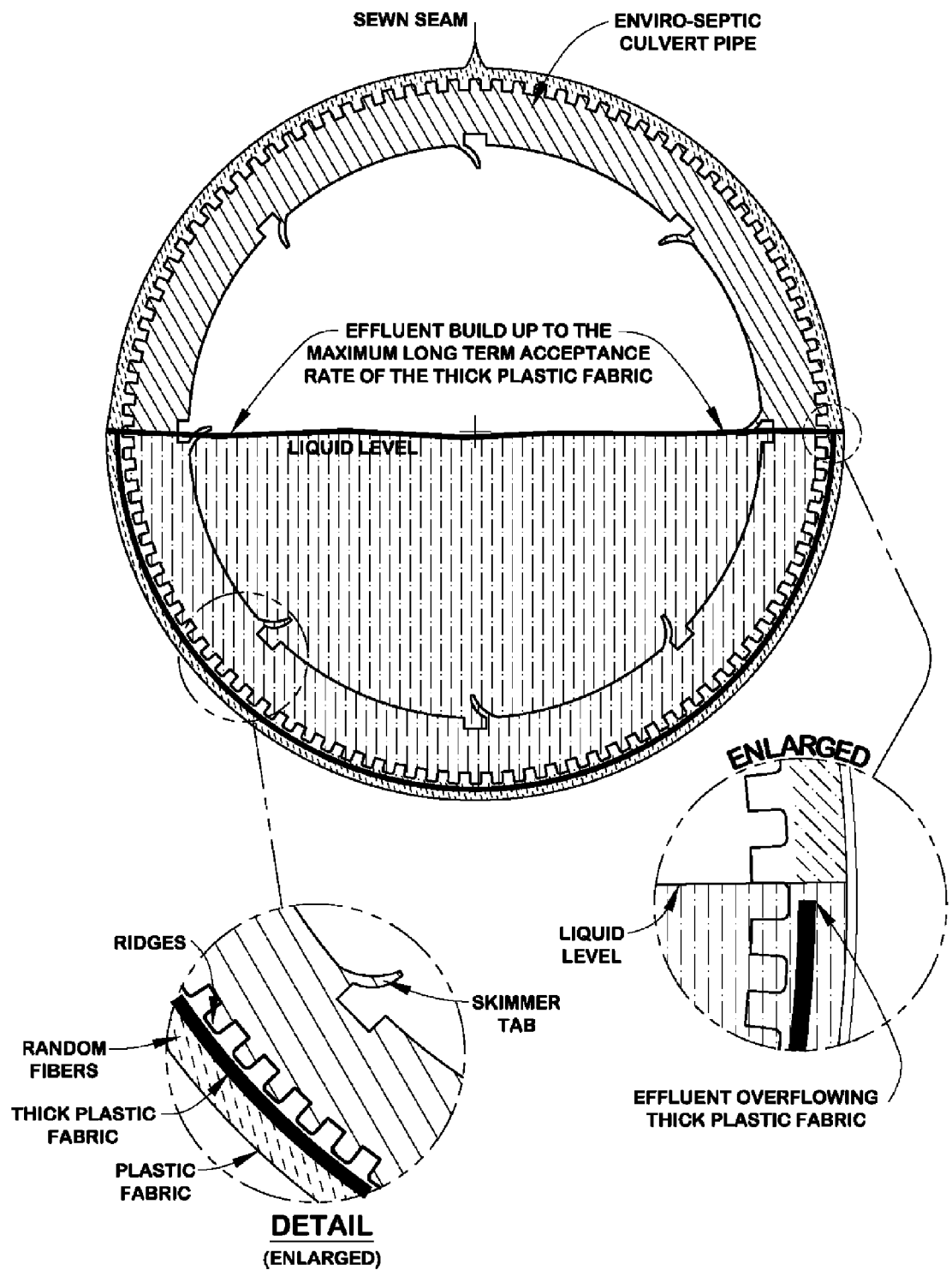
FIG. 5. identified as "STAGE 3A" is an illustration of further stages of function of the pipe as illustrated in FIG. 2. ENVIRO-SEPTIC® (NEW A) and shows effluent has begun to overflow the new fabric layer.
Figure 6:
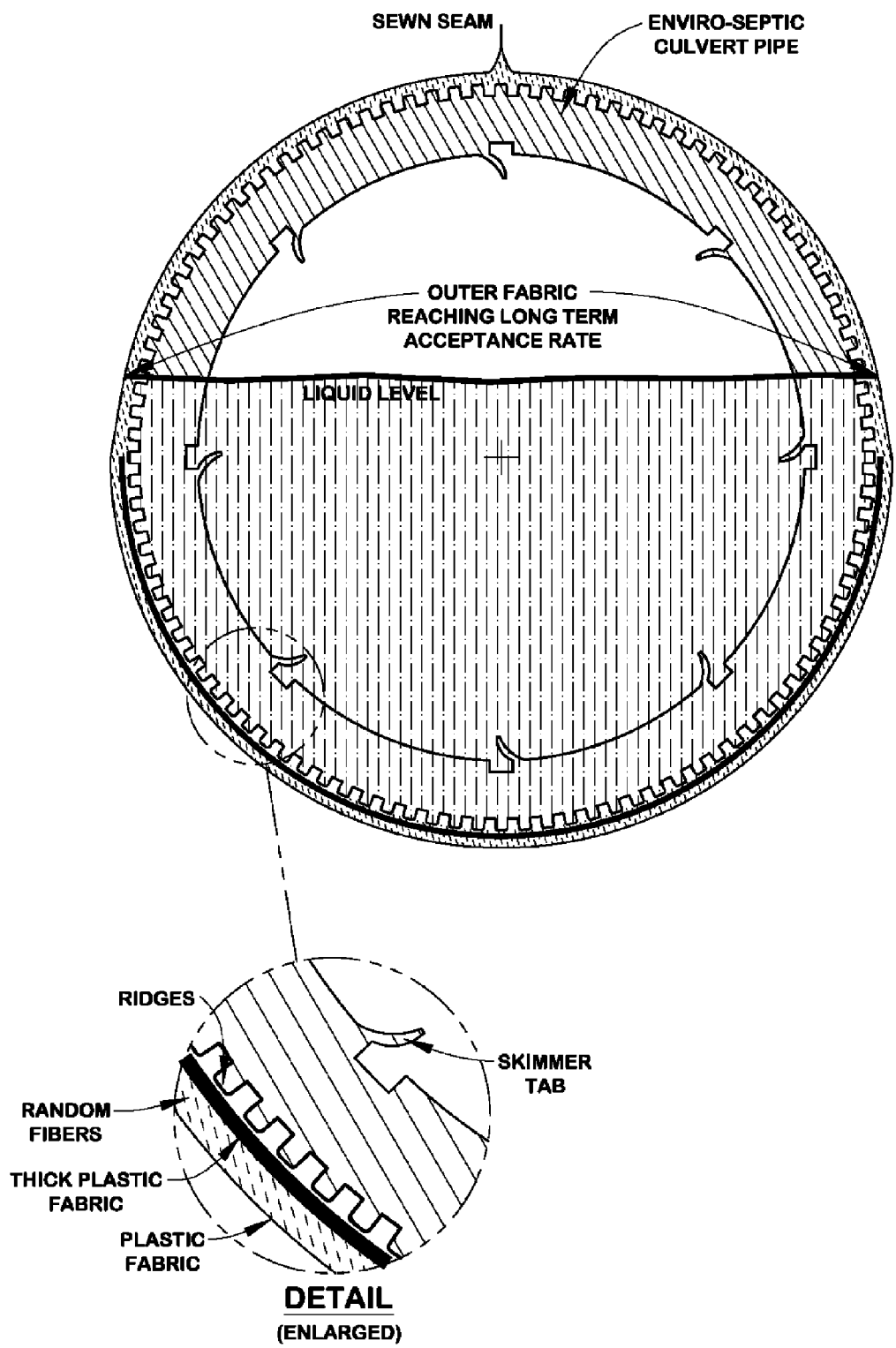
FIG. 6. identified as "STAGE 4A" is an illustration of further stages of function of the pipe as illustrated in FIG. 2. ENVIRO-SEPTIC® (NEW A) and shows the outer fabric reaching the maximum long term acceptance rate.
Figure 7:
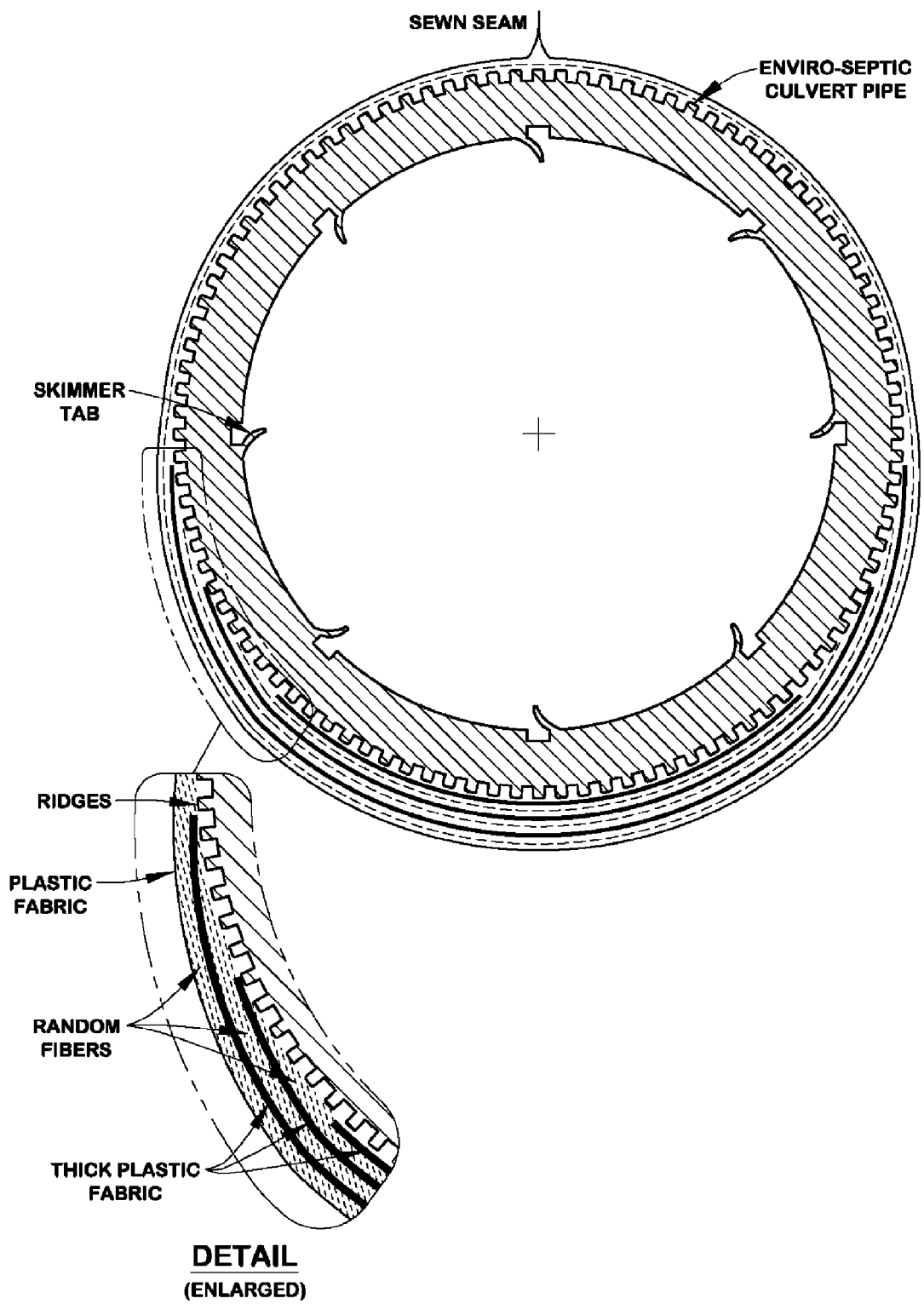
FIG. 7. represents another new form of ENVIRO-SEPTIC® (NEW B) and is an illustration of the pipe having a random fibers and a plastic fibers wrapping of the pipe and a plurality of dense fiber on a portion of the pipe outer surface circumference and a plurality of random fiber covering, such random number being 3 in this instance.
Figure 8:
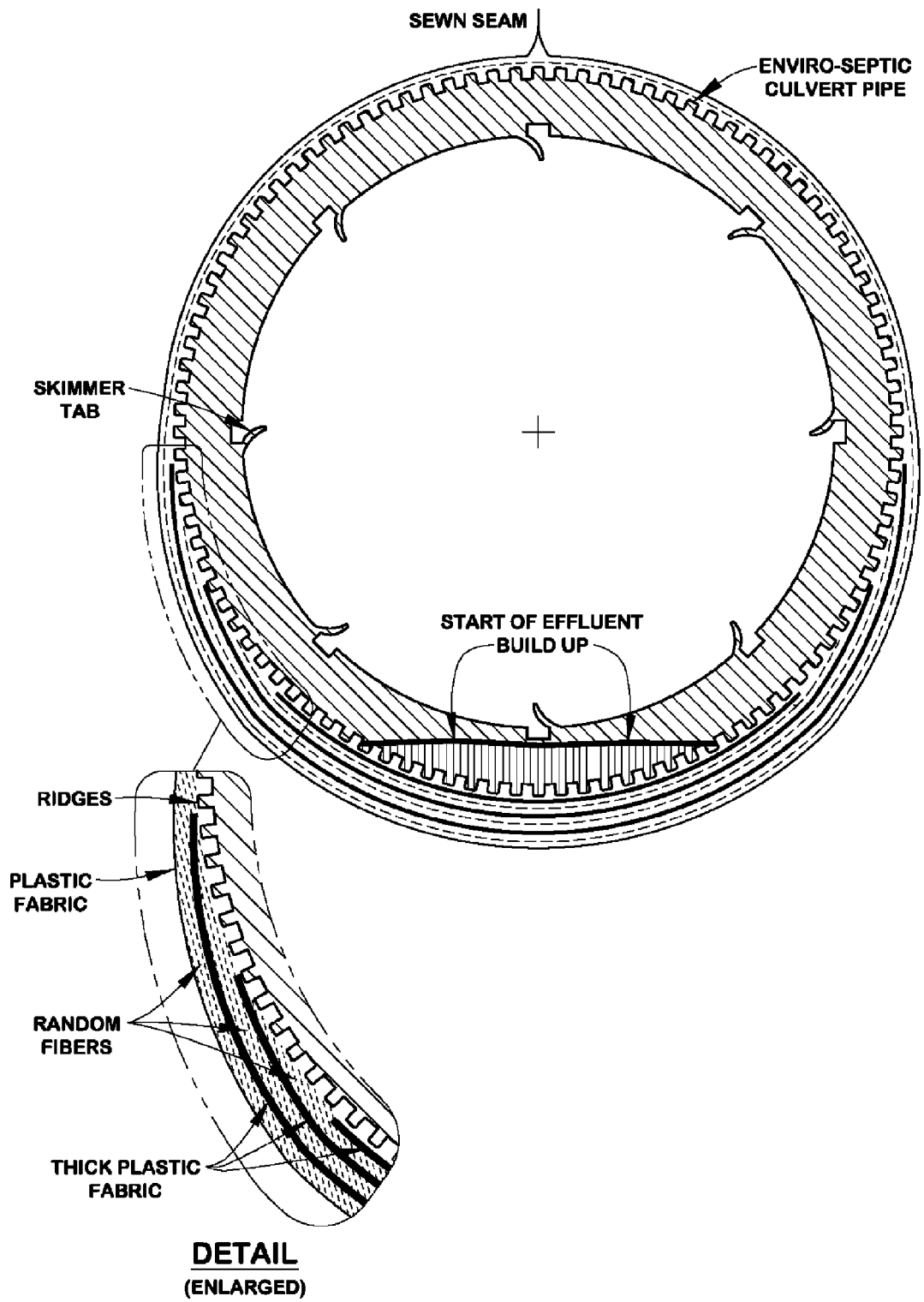
FIG. 8. identified as "STAGE 1B" is an illustration of the early stages of function of the pipe as illustrated in FIG. 7. ENVIRO-SEPTIC® (NEW B) and shows effluent starting to build up on the first of the 3 new fabric layer reaching toward its maximum long-term acceptance rate.
Figure 9:
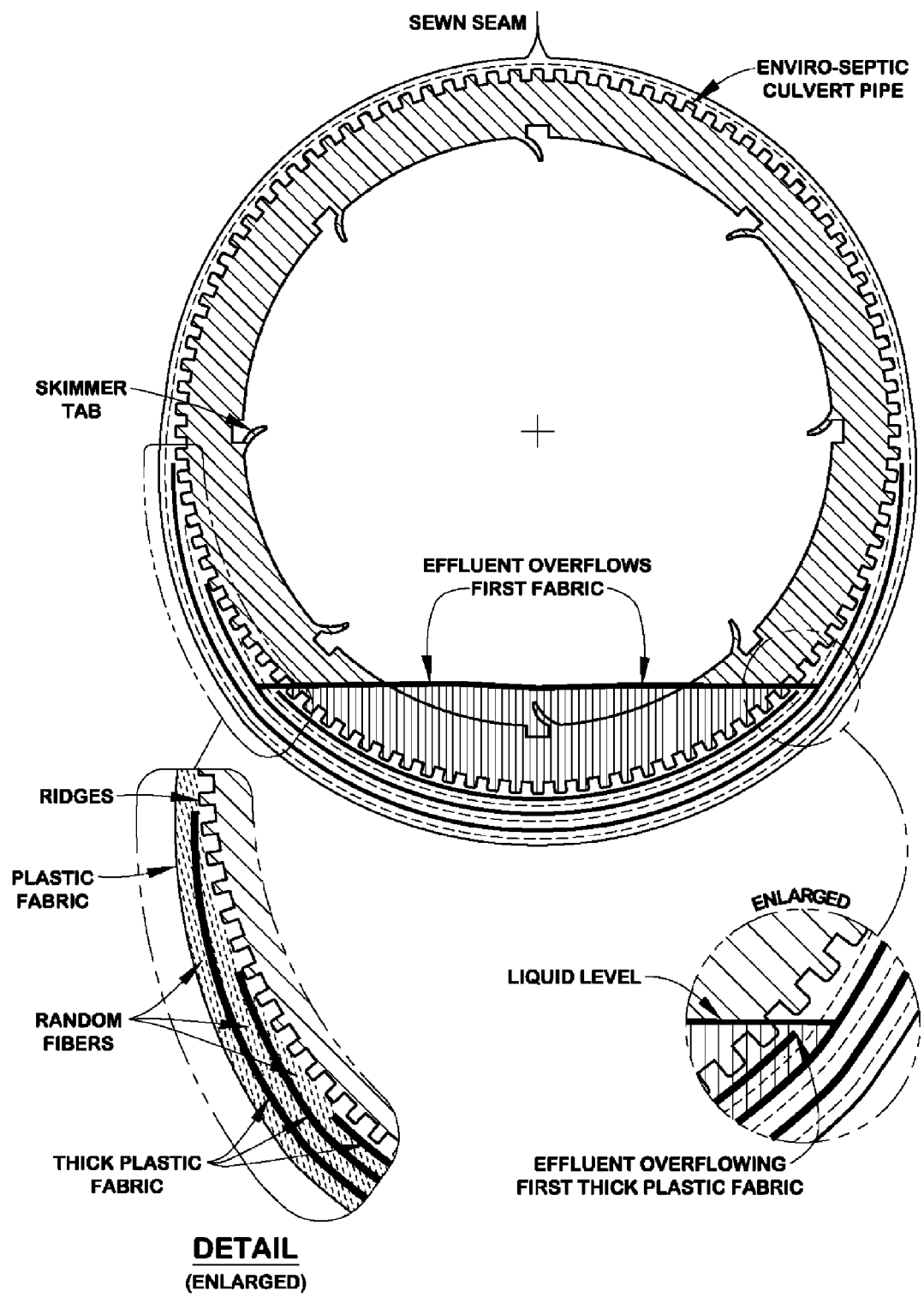
FIG. 9. identified as "STAGE 2B" is an illustration of stages of function of the pipe as illustrated in FIG. 7. ENVIRO-SEPTIC® (NEW B) and shows effluent which has begun to overflow the first new fabric layer is building up on the second of the 3 new fabric layer.
Figure 10:
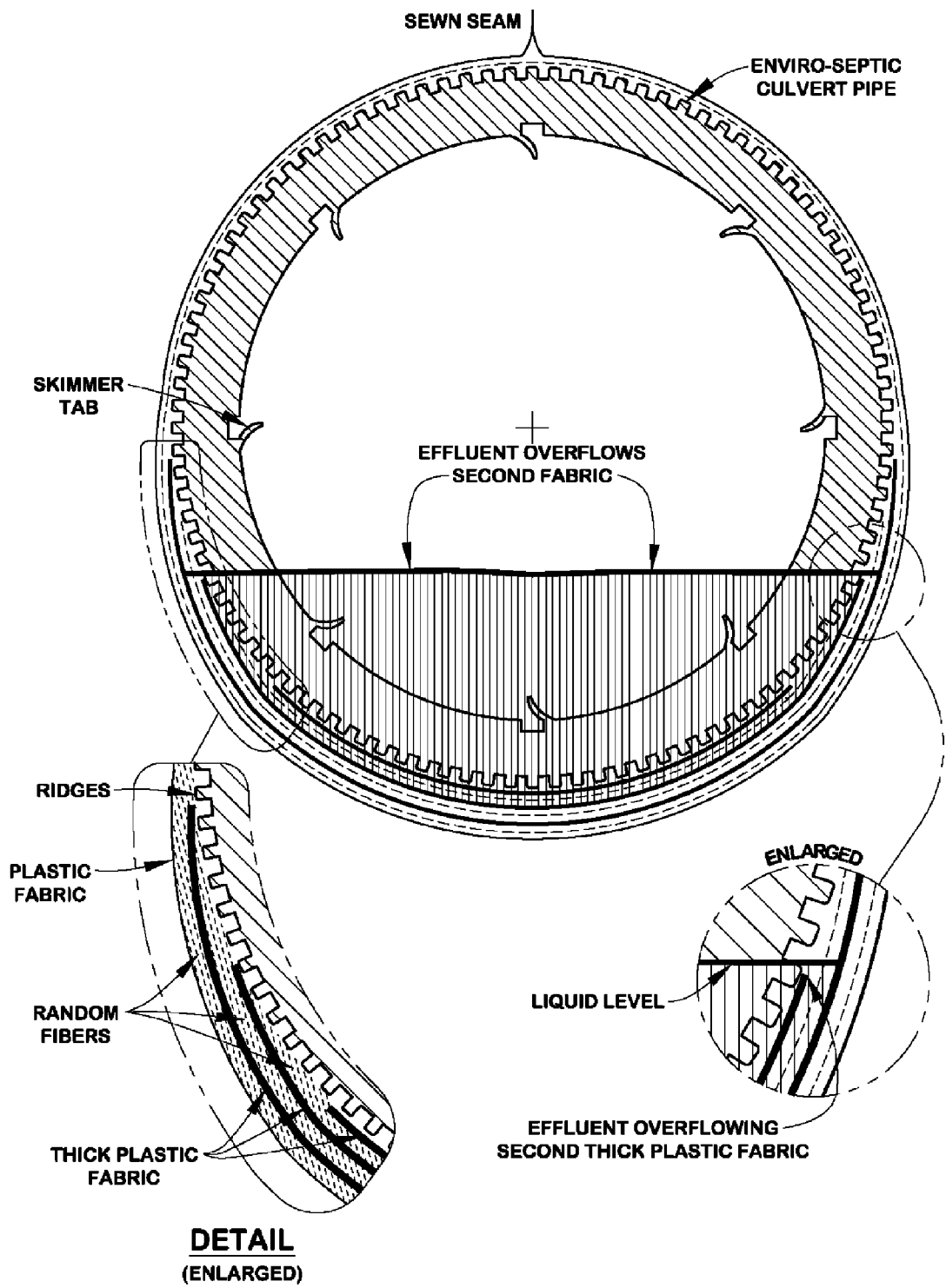
FIG. 10. identified as "STAGE 3B" is an illustration of further stages of function of the pipe as illustrated in FIG. 7. ENVIRO-SEPTIC® (NEW B) and shows effluent which has begun to overflow the second of the 3 new fabric layer is building up on the third of the 3 new fabric layer effluent.
Figure 11:
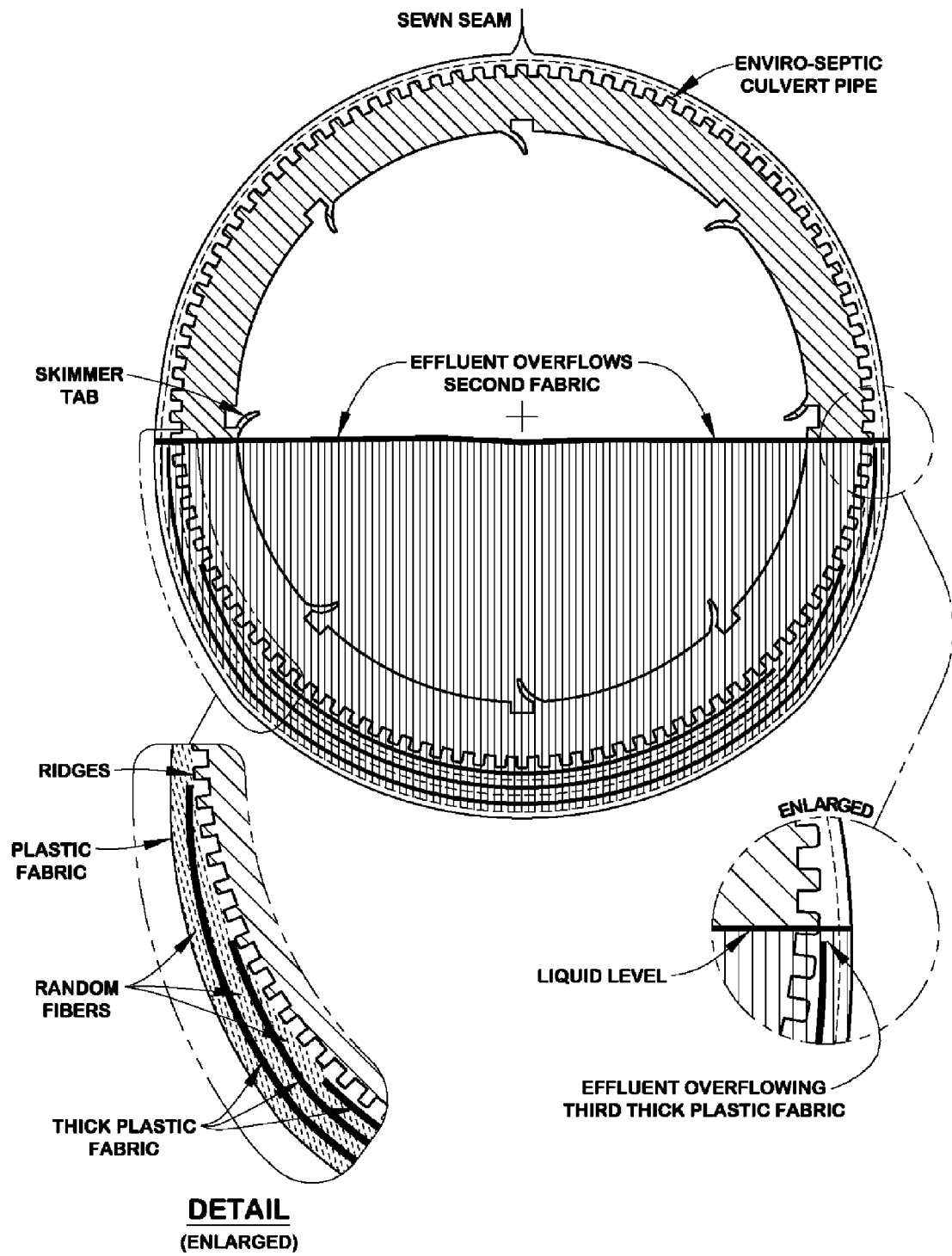
FIG. 11. identified as "STAGE 4B" is an illustration of further stages of function of the pipe as illustrated in FIG. 7. ENVIRO-SEPTIC® (NEW B) and shows effluent which has begun to overflow the third of the 3 new fabric layer is building up on the outer fabric which will eventually be reaching the maximum long term acceptance rate.

It would be advantageous to have a treatment system which would include a leach system which would more efficiently and effectively process the leachate or effluent from the septic tank or precipitation apparatus. Use of such an improved fluid conducting conduit structure within a drainage field would result in longer life, less area needed to handle a specific amount of outflow of liquid, and a cleaner and safer treated liquid returning to the environment. The improved fluid conducting conduit structure defined and claimed herein provides these advantages without a large increase in cost, does not require any additional maintenance, and, in fact, requires less maintenance, is incorporable into standard treatment designs and configurations, would be easily installed as new or replacements into existing and in-place leach fields, and would provide flexibility to incorporate a variety of specially designed uses to result in a custom system based upon special or specific needs within the treatment system.

There is nothing currently available which satisfies these needs and objectives. However, the present invention disclosed herein addresses these objectives.

The following is a description of the preferred embodiment of the invention. It is clear that there may be variations in the size and the shape of the apparatus, in the materials used in the construction, and in the orientation of the components. However, the main features are consistent and are:
1) Multiple layers of fabric rather than screens;
2) Fabric layers of varying deniers and/or thickness;
3) Useful in wrapping smooth-walled and corrugated plastic pipe;
4) With the selection of fabric and fabric denier, specific fluid treatment objectives can be met;

5) The multilayer fabric provides boundaries/interfaces and regions within which specifically chosen bacteria, chemicals, microbes and the like may be introduced to facilitate the biodegradation of specifically chosen undesirable materials; and 6) Improve performance over the currently known leach fields.

By using multilayers, one is able to have a medium for different types of bacteria to collect on and break down on, as well as divide them by particle size. All prior systems have structures with members that are pressed tightly against the pipe itself, causing shadowing to take place where the fabric touches the pipe or the members. By using multilayers of fabrics starting with the very coarse denier working down to a fine denier, one is able to alleviate all of the shadowing effect, which has never before been achieved. At the same time, larger particles are being sorted or separated from smaller particles, allowing the bacteria in the effluent to work more efficiently on these particles.

It should be noted that multilayered fabrics may be used with basically all chamber-type systems, such as, for example, infiltrators, contactors, and bio-diffusers and with smooth-walled perforated pipe as well as corrugated plastic pipe. The multilayer fabric could be used inside of a product known as ELJEN IN-DRAIN™ treatment system to extend the life of the product, as discussed in greater detail with reference to FIG. 20.

Because of the fibers being used in multilayers, the ability of the aerobic bacteria to work on the particles is increased due to the ability of the liquids to be wicked throughout the fabrics (due to capillary action) thereby inducing more air, which will also change the state of the nitrogen content and other chemicals within the effluent so they may change more readily into gas and escape from the soils to the atmosphere above. Within the multiple layers there will be more storage area for the fine suspended particles that frequently clog standard systems. Oils, greases, and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases, and chemicals takes place, permitting treated fluid to pass omnidirectionally through the unstructured assemblage of fibers.

With the use of multilayers of fabrics, it is possible that one can set up systems which would handle garage floor drain wastes by allowing the bacteria action to take place in the first few layers, the oil to be trapped on other layers, and the water to pass through the final layers, and then returned back to the clean soils. The floor drain fluid would be directed to a treatment bed or field similar to a leach field. In the treatment field would be conduit having means for allowing the passage of the floor drain fluid outwardly of the conduit and subsequently into the multilayer fabric wrapped around or at least covering the conduit. The fabric may be specially treated to process the particular drain fluid in order to place it in condition to be returned to the earth.

The INFILTRATORT™ brand of leaching structure, with the MICRO-LEACHING CHAMBERS™ brand of wall perforations is a chamber device used in leaching systems and is considered herein as a conduit. This form of conduit directs fluid flow even though it is somewhat similar to a semicircular cross section of a length of perforated corrugated pipe. That is, if perforated, corrugated pipe was halved along its axis, and the halves were laid in trenches with the opening of the half downwardly directed, a conduit similar to this brand of leaching conduit would result. Multilayer fabric having the characteristics previously noted, placed over this device will result in improved performance. Further, the multilayer fabric placed across the downwardly directed open portion would likewise improve the performance of the leaching system.

The use of multilayer fabric would also permit cleaning of water coming into a pipe so that it could be possible to take water that has been contaminated (areas of contaminated soil) and pass it through the multilayers and have bacterial growth on the outer surface and have cleaner water as it goes in the system. It would be effective in the removal of oils, greases, and other chemicals. In the application where fluid to be treated is entering the conduit or pipe, the layer of fabric in contact with the pipe may have a denier lower in value which is finer than the denier of the adjacent additional/outer layer of the multilayer fabric. Where there are more than two layers, it is important to note that each additional layer has a denier different from each additional layer adjacent thereto. In other words, where fluid is moving from inside to outside, the first layer will be more coarse than the coarseness of the next layer. Another layer over the next layer need only have a level of coarseness different than that of the next layer. Further, if yet another layer was added, it is only necessary that the coarseness of that layer be different from the layers adjacent.

It should be noted that the use of such fabrics with any kind of septic system or drainage system will result in improved performance. By allowing multiple layers of bacteria to form around the interior of the different layers, one can ultimately reduce the amount of necessary leach area surface that is needed for the system to operate properly. On most septic systems there is only one bacterial interface surface. By doing multiple layers of fabrics, one not only maintains the initial surface area which is the soil interface with the fabric, but bacterial growth will take place on the multiple layers. For each layer on which bacteria grow, the amount of leach area surface needed to do the job is significantly reduced.

It is also important to note that with the use of the multilayer fabric, liquids will be diffused/dispersed without channeling the liquids in a forced direction, adding considerably to the life of any septic system.

One of the particular features of the present invention is now described and disclosed.

Through testing of the ENVIRO-SEPTIC® wastewater treatment system, surprisingly Applicant/Inventor hereof has learned that, by adding a dense layer of geo-textile fabric in the lower section of the pipe and thus covering a portion of the circumference of the pipe (C)—such portion being preferably less than one-half of the pipe circumference (<1/2C) and placed between the pipe outer surface and a layer of coarse random fibers—Applicant was able to get bacteria to grow very quickly. Such result forces the system to generate bacteria more quickly, thereby causing the system performance to be enhanced in quality of performance and in the speed of performance—speed of performance was increased over prior art methods by a substantial amount.

The extra layer of dense fabric not only helps to treat the effluent better, but also helps to extend the life of the outer layer of fabric wrapped around the pipe. In the prior reference Patents of Applicant, referred to herein on occasion as the original ENVIRO-SEPTIC® pipe, the outer layer of fabric eventually gets a buildup of sludge that escapes through the holes in the pipe settling on the inside of the outer layer of fabric. By adding the new layer of dense fabric, the sludge is trapped on this layer, thereby protecting the outer layer of fabric from this sludge. At the time of initial startup, this new dense fabric layer will screen the effluent better, thereby causing the effluent to travel the whole length of the pipe quickly and uniformly. As the effluent passes through the dense fabric layer, the bacteria will reach a long-term acceptance rate faster, and the effluent will overflow or pond above the upper edges of the dense layer, eventually overflowing down and into the coarse random fibers and passing through the outer layer of fabric. Allowing the effluent to travel the whole length of the pipe results in the spreading of the loading throughout—a process that allows more air and better bacterial growth and action. During this process, a second biomat forms on the inner surface of the outer fabric and now becomes the treatment surface. It is not clogged by the sludge, because it is being protected by the dense layer of fabric next to the pipe.

This dense layer of fabric does not stop the penetration of effluent. It slows the effluent down and filters it better, allowing the bacteria to grow sooner and in greater numbers.

This extra layer of dense fabric will allow for longer life expectancy than is now achieved or even expected from the standard and Patented ENVIRO-SEPTIC® system. It will also allow the system to reach its peak environmental performance in a much shorter period of time.

Yet another of the particular features of the present invention is now described and disclosed.

It has been discovered surprisingly that incorporating (i.e., adding) a plurality (from 2 to "n" dense layers) of dense layers of geo-textile fabric in the lower section of the pipe, wherein each of the ones of the plurality of dense layers is designed for covering a portion of the circumference of the pipe (C), increases the performance of the present invention. Each of the dense layers beginning with a first dense layer—the layer which is in contact with the outer surface of the pipe—being preferably substantially about equal to about ½ of 1/n th of the pipe circumference (C) and placed between the pipe outer surface and a layer of coarse random fibers. The second ($2^{nd}$) dense layer would be placed onto or over the coarse random fiber layer (note that all of the coarse random fiber layers may be of sufficient size to cover the pipe circumference, or they may be of a dimension to cover a portion of the pipe greater than the dense layer inwardly directed and perhaps less than the dense layer contacting the outwardly directed surface of the $2^{nd}$ dense layer. This relationship will be applied to each of the successive dense layers to the final n th dense layer. It is clear that each of the coarse fiber layers may completely encircle the pipe, because the flow-through of the fluid is minimally affected by the material of the coarse fiber layers. Applicant was able to get the bacteria to grow very quickly. Such result forces the system to generate bacteria more quickly, thereby causing the system performance to be enhanced in quality of performance and in the speed of performance—speed of performance was increased over prior art methods by a substantial amount.

These and further objects of the present invention will become apparent to those skilled in the art to which this invention pertains and after a study of the present disclosure of the invention.

The following is simply a description and disclosure of the use of the present invention resulting in the creation of pipe produced by the process and including various combinations and materials, all of which are products produced by the process of this invention.

Figure 12:
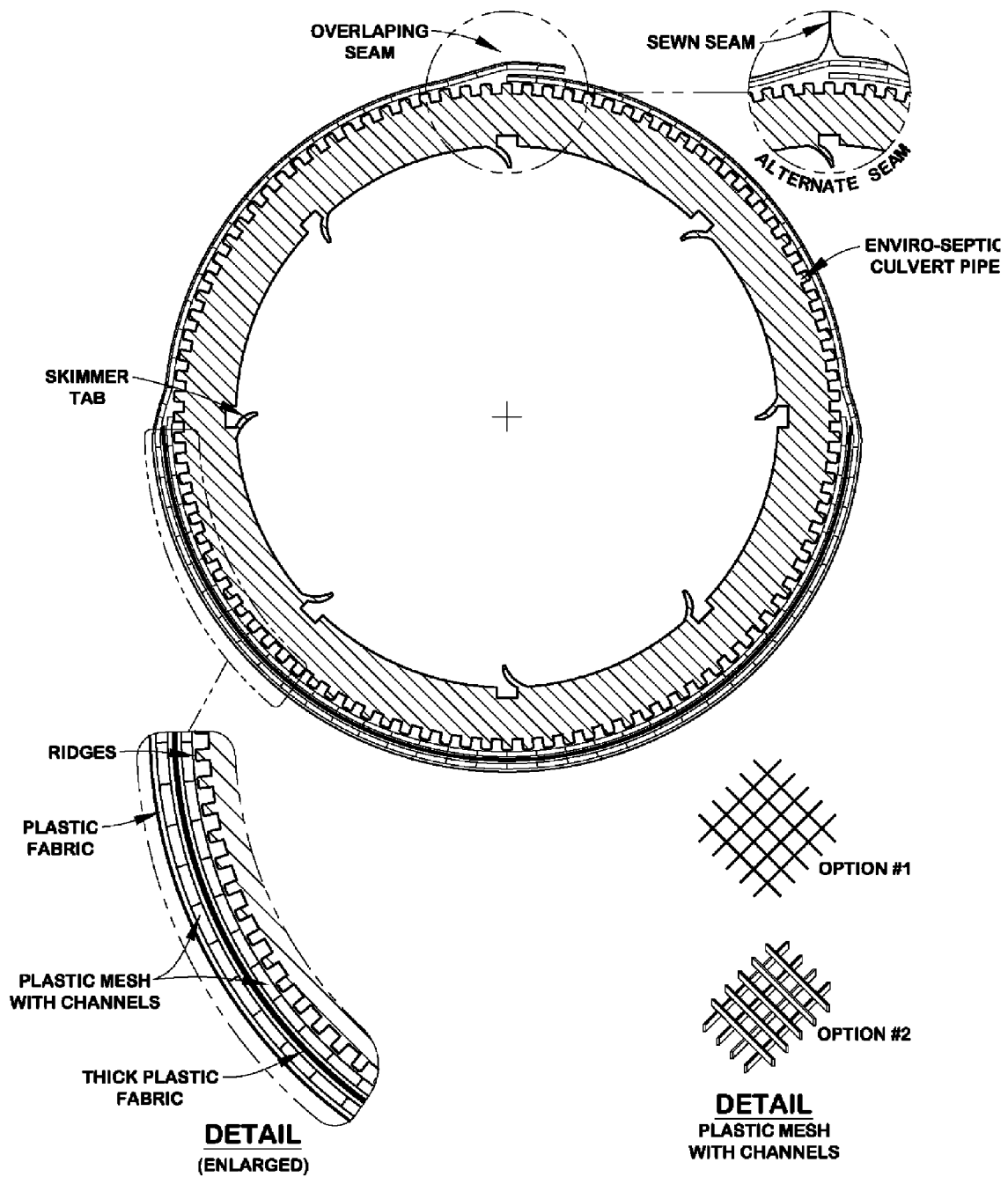
FIGS. 12-20 are a plurality of drawings showing various configurations relative to form and layers of fabric materials so as to illustrate the use with alternative conduits.

FIG. 12 shows a pipe with a plastic grid mesh and channels with a partial covering of fiber and plastic grid mesh which will function very well in the process of removing the heavier, more dense material from the effluent fluid and, further, start the bacteria development more quickly, resulting in an improvement in the processing system. The partial layers can be created or designed in such a way that the inner one will cover less surface area and then can have more partial covering layers (with each, a little more surface being covered), so that when the first one overflows and runs into the second one, it has to fully cover that surface with bacteria and particles before it will overflow, thus running into the next/adjacent one. This feature can also be seen on FIGS. 18 and 19. It is important to note that there may be as many partial layers as needed, i.e., as it takes to clean the water or liquids. Each layer of fiber could actually have a different denier and thickness and alternate in any fashion from thick to thin and back to thick. This whole process will help the bacteria to come up to speed inside the fibers without being blocked as would or could otherwise happen, and consequently the liquids are cleaned faster and more completely, improving thereby the safety of the deposit into the environment.

Figure 13:
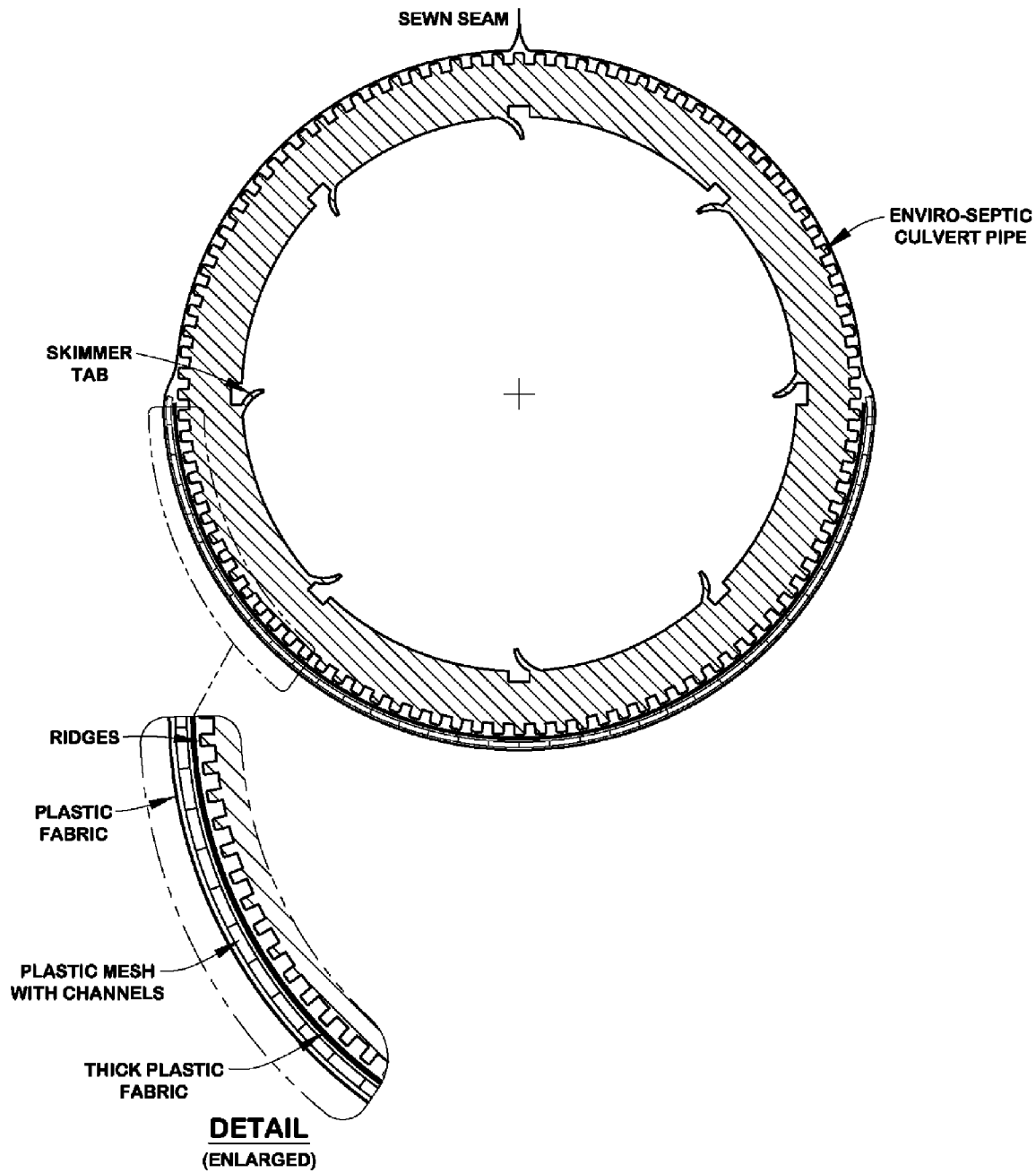

FIG. 13 is similar to FIG. 12, but the pipe used is a SIMPLE SEPTIC® treatment pipe in form.

Figure 14:
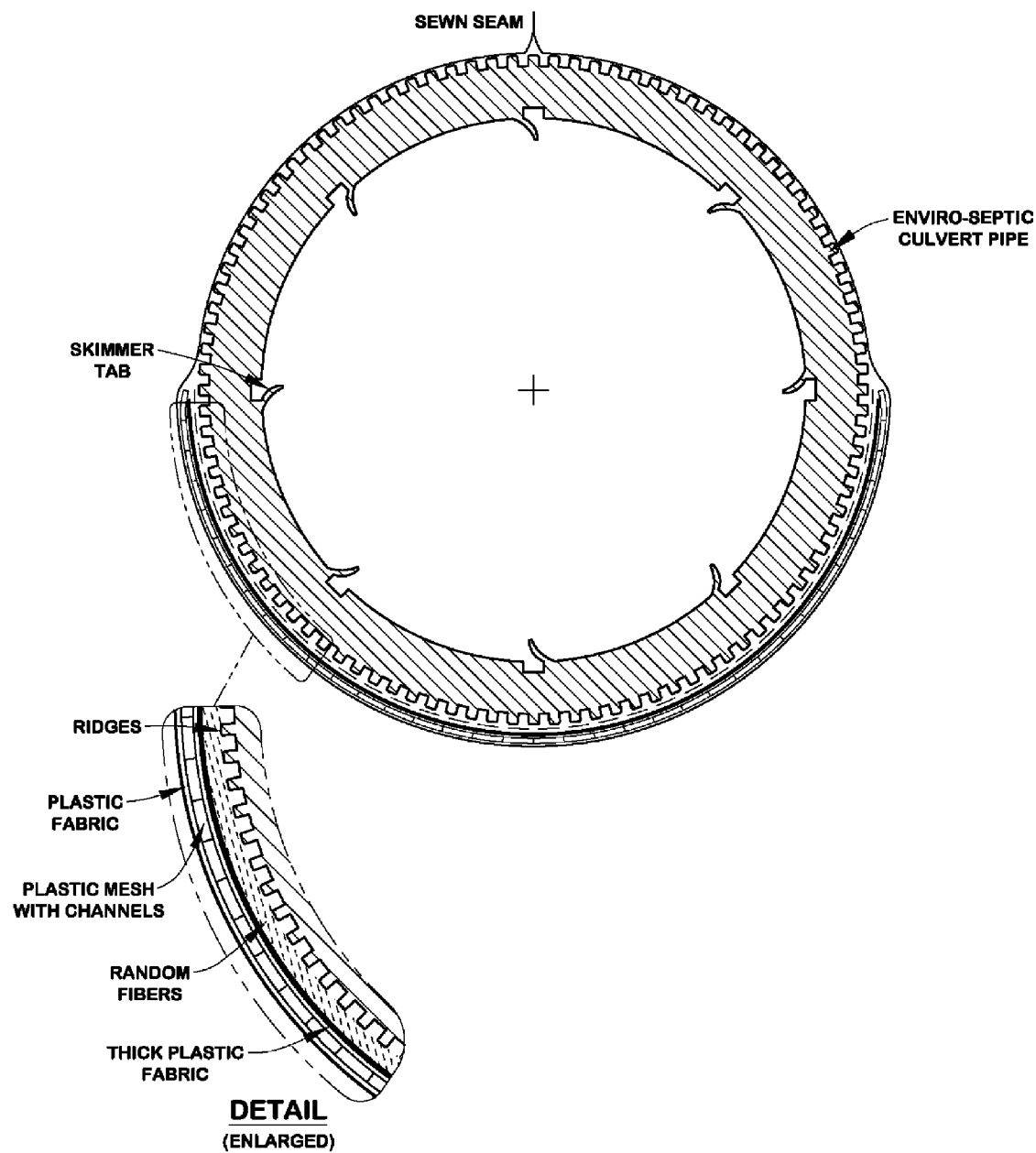
Figure 15:
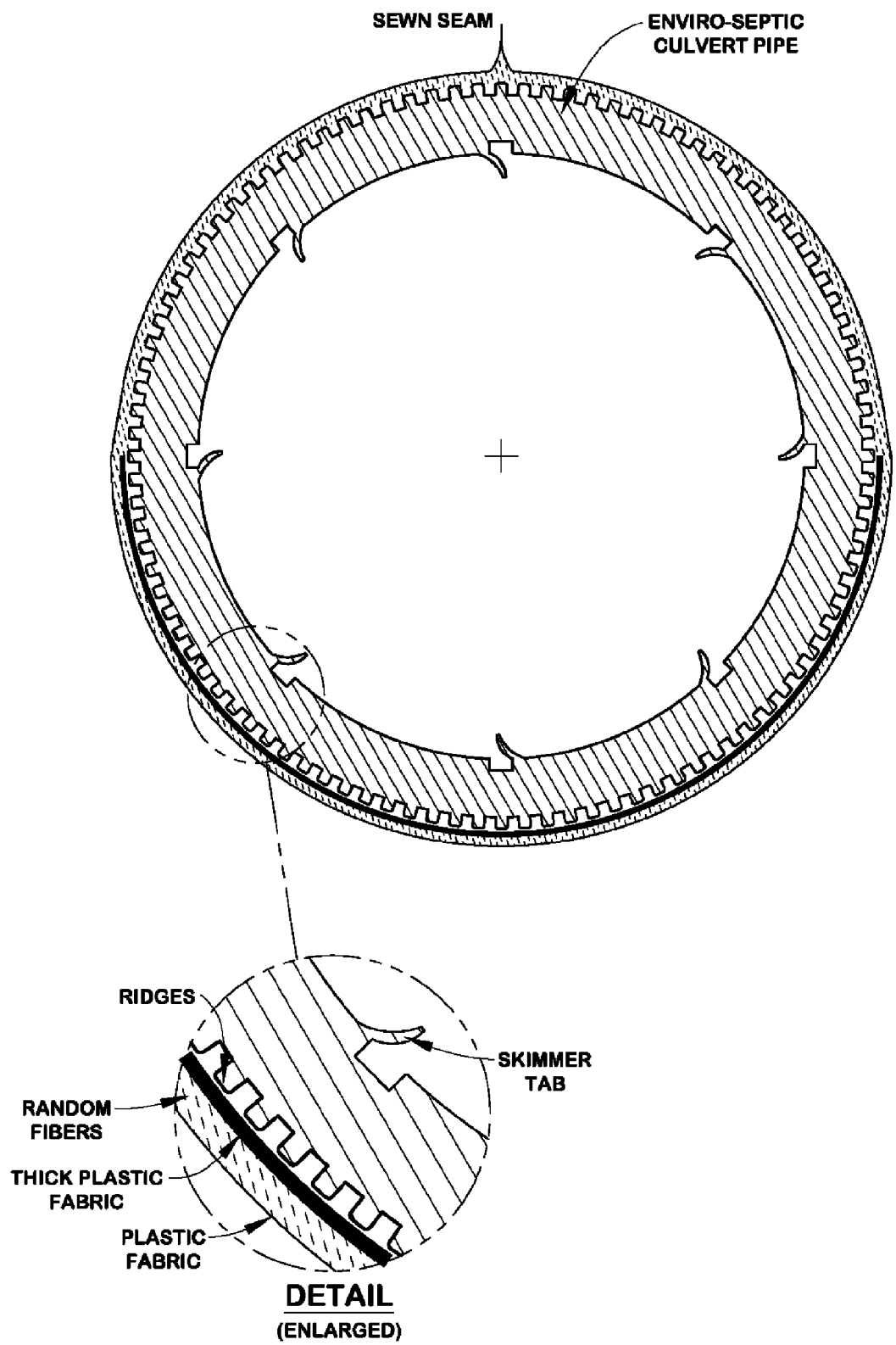

FIGS. 14 and 15 shows ENVIRO-SEPTIC® pipe with a random coarse fiber layer, a fabric layer, a plastic mesh layer, and another fiber layer. This design could be altered to better the processing of certain fluid, such as by having the fiber mesh or the plastic mesh layer in different locations and increasing the number of layers duplicating the arrangement of fabric types. FIG. 15 is a drawing of an original ENVIRO-SEPTIC® pipe with a single layer of partial fabric between the pipe and random coarse fibers.

Figure 16:
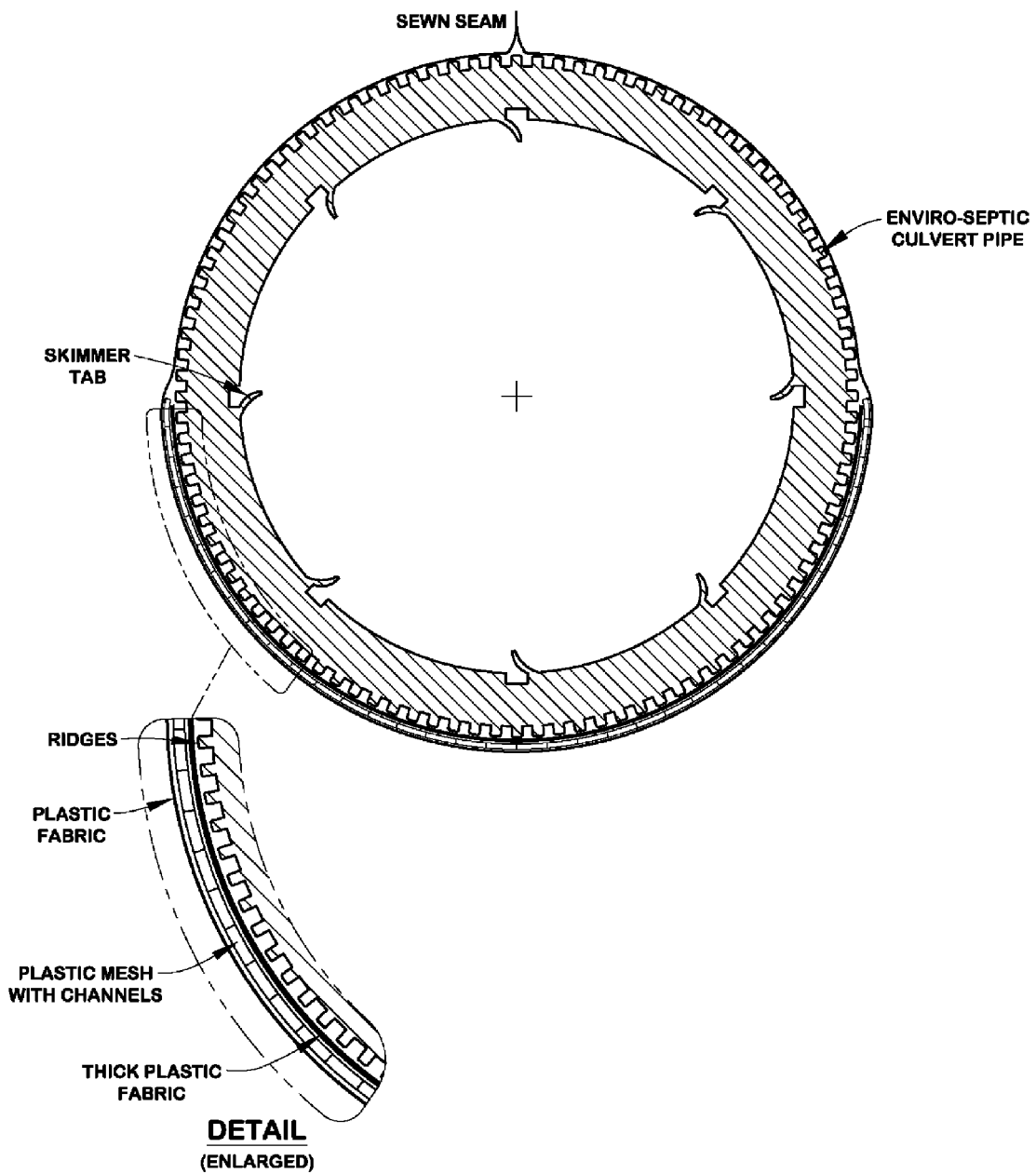

FIG. 16 shows a pipe very similar to what is considered an older form of pipe to which is added a fiber and plastic mesh in a partial covering and then a final cover all the way around the pipe.

Figure 17:
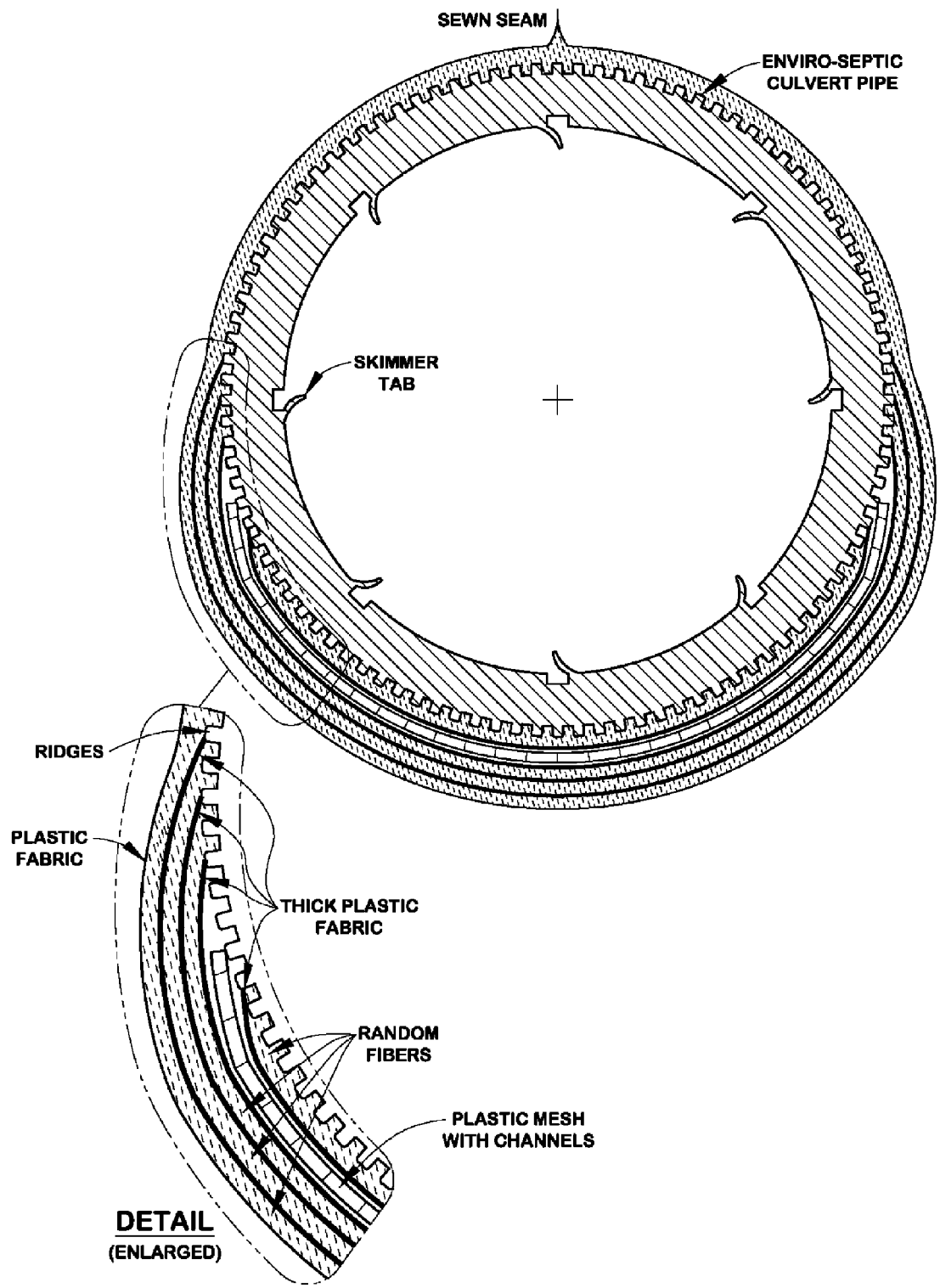

FIG. 17 again shows an ENVIRO-SEPTIC® pipe with a partial layer of coarse random fiber and fabric covered with a second partial layer of a plastic grid mesh and fabric slightly wider with another layer of coarse random fiber and fabric that is a little wider than that which is over it. Finally, the entire pipe is covered with a wrapping that is the coarse random fibers and fabric. The partial coverings can alternate between a plastic grid mesh or coarse random fibers or could be all of one type or the other type. Also, one could use any kind of materials which could be used as a separation between the fabric layers. The layers of fabric can be any denier or thickness depending on what is necessary for the type of liquids being cleaned. These multiple layers, when in operation, will allow liquids to pass through all the layers. As the first partial layer becomes blocked from bacterial growth, the pass-through rate of the liquids slows down, and the liquids will start to flow over into the second partial layer. As that layer blocks, the liquids will flow over into the third layer—and so on. When initially put into use, the liquids will pass through all of the different layers, growing a bacterial base in all of them. The screening of the different partial layers will protect the layers below it to allow it a longer life and better bacterial growth thereby protecting the environment. Again, it is important to note that this product produced by this method could be used to clean fluid other than effluent.

Figure 18:
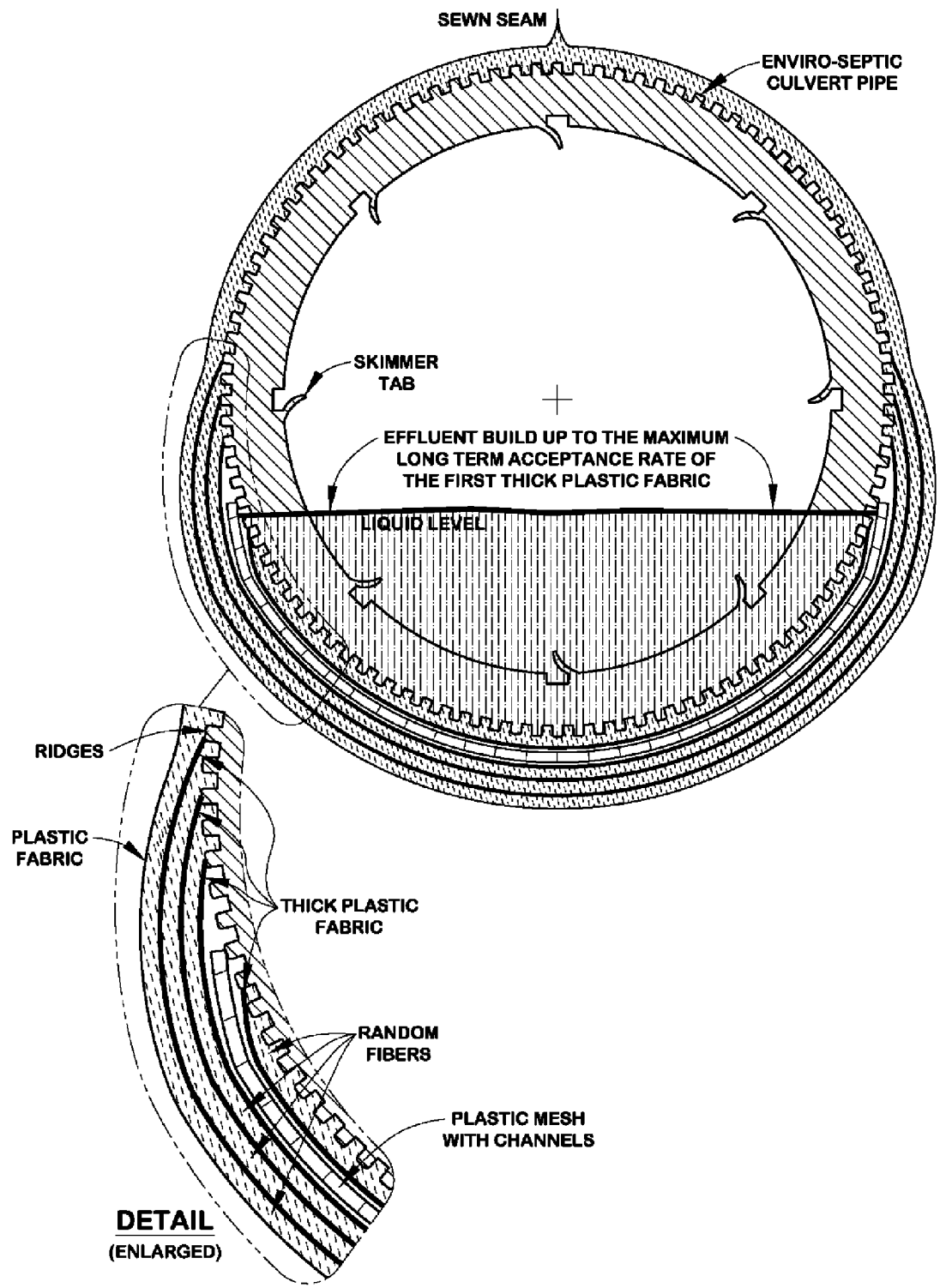
Figure 19:
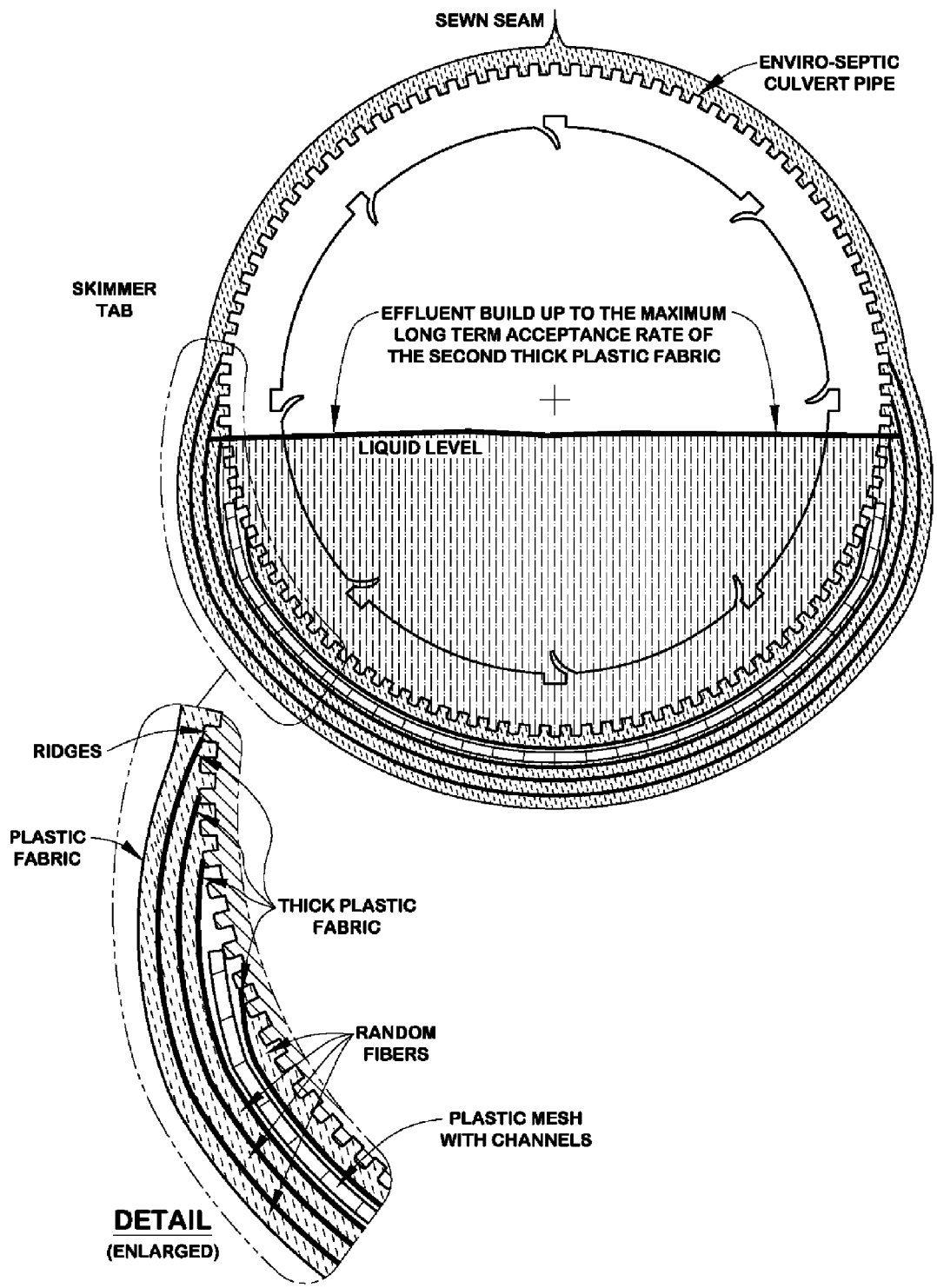

FIG. 18 simply first shows the liquid level flowing over the first partial layer, and FIG. 19 shows the liquid level flowing over the first and the second partial layers.

Figure 20:
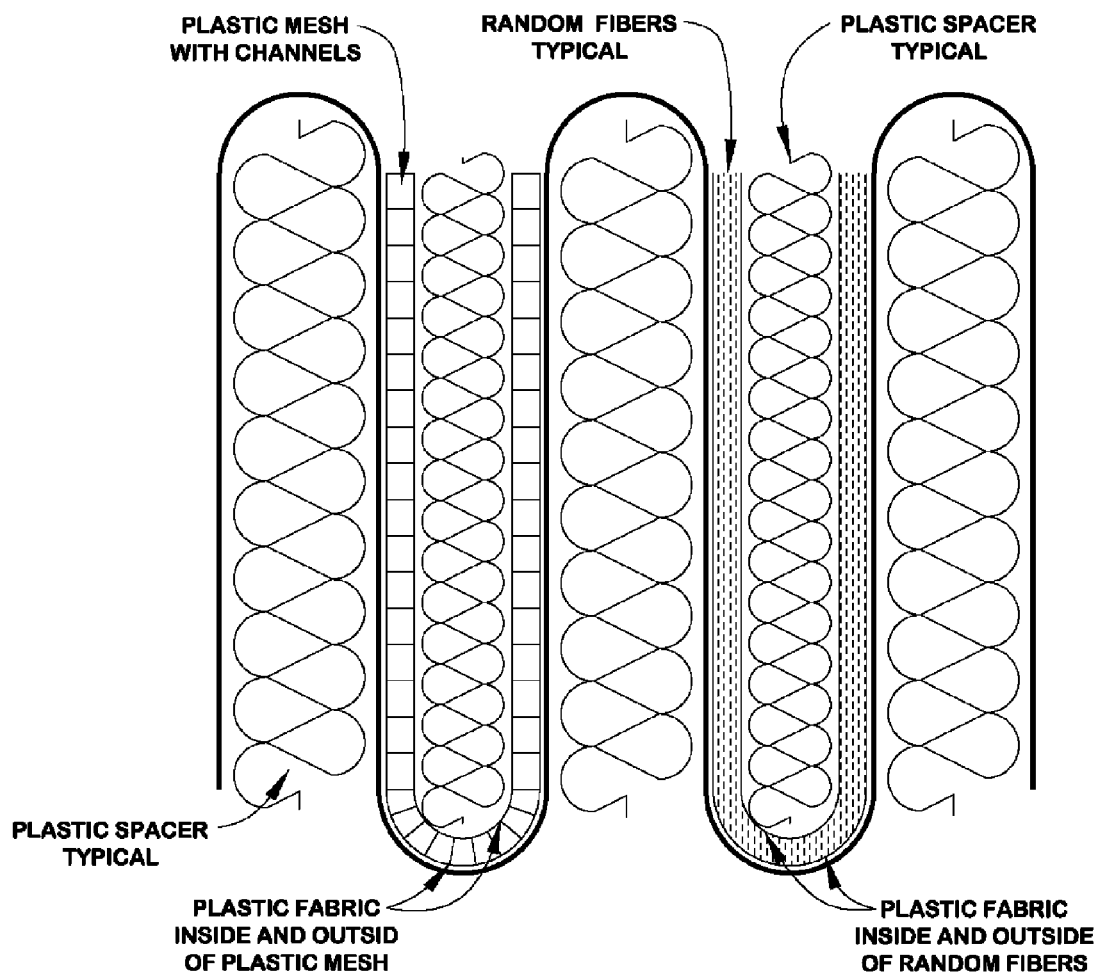

FIG. 20 is a simple representation of an ELJEN IN-DRAIN™ system, well known to those of ordinary skill in the field of septic waste processing, simply being shown to illustrate use of the present invention within the cavities of the covering, thereby improving the efficiency and the environmental abilities of the basic ELJEN system (i.e., partial fabric layers are put between the plastic spacers and the original fabric, thereby better accomplishing the objective of the system).

In all of the above drawings, it is further noted that the seams at the top can be either stitched, heat bonded, or just overlapped.

It is thought that the present invention, the means and method and the conduits produced thereby and having included therewith a multilayer fabric of varying deniers for primarily the processing and treatment of fluids which must be treated to remove materials so that the resultant treated fluid may be reused and/or returned to the earth, and many of its attendant advantages is understood from the foregoing description, and it will be apparent that various changes may be made in the form, construction, and arrangement of the parts thereof without departing from the spirit and scope of the invention or sacrificing all of its material advantages, the form hereinbefore described being merely a preferred or exemplary embodiment thereof.

What is claimed is:

1. A device comprising:
   a conduit having a circumference and including apertures therethrough;
   a first fabric layer covering a lower section of the conduit and less than one-half of the circumference of the conduit;
   a first coarse layer surrounding the first fabric layer;
   a second fabric layer over the coarse layer and covering completely the circumference of the conduit; and
   a third fabric layer and a second coarse layer, the third fabric layer positioned between the first coarse layer and the second coarse layer, wherein the third fabric layer covers a greater portion of the conduit than does the first fabric layer and does not cover the entire circumference of the conduit.

2. The device of claim 1 further comprising a plurality of additional fabric layers and coarse layers, each fabric layer positioned between two coarse layers and wherein each successive fabric layer from interior to exterior covers a greater portion of the circumference of the conduit.

3. The device of claim 1 wherein the coarse layer comprises a coarse, random fiber layer.

4. The device of claim 1 wherein the coarse layer comprises a plastic grid mesh.

5. The device of claim 1 wherein the first fabric layer is a geo-textile fabric.

6. The device of claim 1 further comprising a biomat on the second fabric layer.

* * * * *